United States Patent
Neuhoff et al.

(10) Patent No.: US 10,906,508 B2
(45) Date of Patent: Feb. 2, 2021

(54) METHOD FOR ACTIVATING AT LEAST ONE SECURITY FUNCTION OF A SECURITY SYSTEM OF A VEHICLE

(71) Applicant: Huf Hülsbeck & Fürst GmbH & Co. KG, Velbert (DE)

(72) Inventors: Stefan Neuhoff, Essen (DE); Boris Ziller, Ratingen (DE); Mirko Schindler, Velbert (DE); Thomas Skaletz, Meerbusch (DE); Matthias Ihln, Düsseldorf (DE); Jan Breer, Essen (DE); Marc Feldsieper, Hattingen (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 16/080,016

(22) PCT Filed: Feb. 16, 2017

(86) PCT No.: PCT/EP2017/053520
§ 371 (c)(1),
(2) Date: Aug. 27, 2018

(87) PCT Pub. No.: WO2017/144345
PCT Pub. Date: Aug. 31, 2017

(65) Prior Publication Data
US 2019/0061686 A1    Feb. 28, 2019

(30) Foreign Application Priority Data
Feb. 26, 2016 (DE) .................. 10 2016 103 482

(51) Int. Cl.
*B60R 25/24* (2013.01)
*G07C 9/00* (2020.01)

(52) U.S. Cl.
CPC .......... *B60R 25/24* (2013.01); *G07C 9/00309* (2013.01); *G07C 2009/00357* (2013.01);
(Continued)

(58) Field of Classification Search
CPC ................................. B60R 2325/101
See application file for complete search history.

(56) References Cited

U.S. PATENT DOCUMENTS

| 8,838,325 B2 * | 9/2014 | Tomik | B60K 28/04 340/438 |
| 2010/0207820 A1 * | 8/2010 | Kawano | G01S 11/02 342/393 |

(Continued)

FOREIGN PATENT DOCUMENTS

EP    1650581    *  4/2006  ............. B60R 25/24

OTHER PUBLICATIONS

Notification of Office Action and Search Report dated Jul. 3, 2020 From the State Intellectual Property Office of the People's Republic of China Re. Application No. 201780011116.7 and Its Translation (of Office Action) Into English. (15 Pages).

*Primary Examiner* — Joseph H Feild
*Assistant Examiner* — Pameshanand Mahase

(57) ABSTRACT

The invention relates to a method (100) for an activation of at least one security function of a security system (200) of a vehicle (1), wherein an authentication at the security system (200) of the vehicle (1) is effected by means of a mobile identification transmitter (300).

22 Claims, 7 Drawing Sheets

(52) U.S. Cl.
CPC .............. *G07C 2009/00555* (2013.01); *G07C 2009/00793* (2013.01); *G07C 2209/63* (2013.01); *G07C 2209/64* (2013.01)

(56) References Cited

U.S. PATENT DOCUMENTS

| | | | |
|---|---|---|---|
| 2012/0268141 A1* | 10/2012 | Gierlich | G01S 11/02 324/617 |
| 2016/0171803 A1* | 6/2016 | Muller | B60L 53/12 340/5.61 |

* cited by examiner

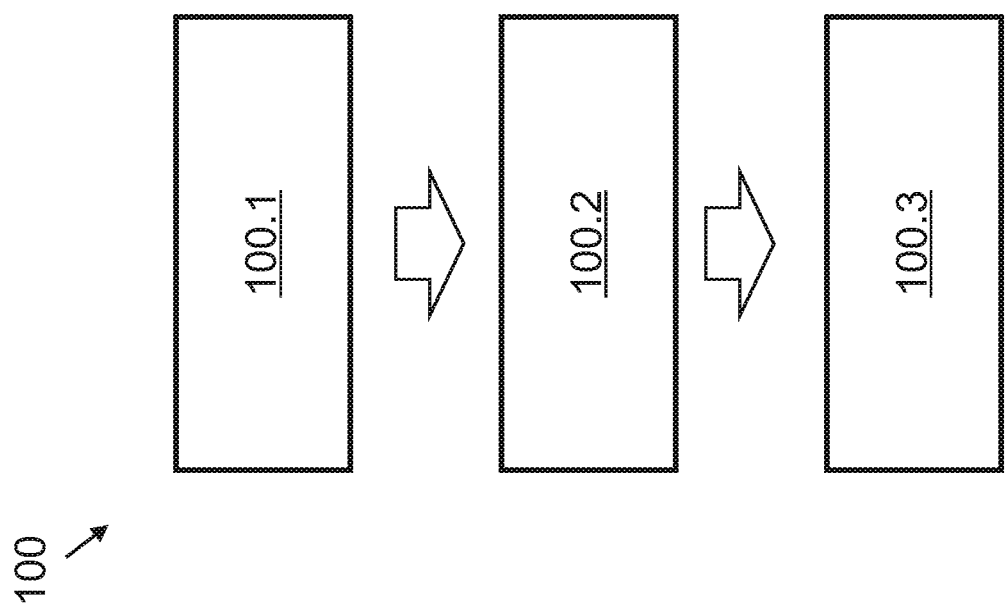

METHOD FOR ACTIVATING AT LEAST ONE SECURITY FUNCTION OF A SECURITY SYSTEM OF A VEHICLE

RELATED APPLICATIONS

This application is a National Phase of PCT Patent Application No. PCT/EP2017/053520 having International filing date of Feb. 16, 2017, which claims the benefit of priority of German Patent Application No. 10 2016 103 482.7 filed on Feb. 26, 2016. The contents of the above applications are all incorporated by reference as if fully set forth herein in their entirety.

FIELD AND BACKGROUND OF THE INVENTION

The present invention relates to a method for activating at least one security function of a security system of a vehicle according to the preamble of claim 1. Furthermore, the invention relates to a mobile identification transmitter according to the preamble of claim 14 as well as to a security system according to the preamble of claim 18.

Mobile identification transmitters (ID transponders) are used as electronic keys in order to enable the unlocking of a security system of a vehicle as an alternative to mechanical keys. Furthermore, ID transponders can be used for numerous further tasks in vehicles to increase user comfort and security. Infrared systems or radio systems in the low frequency (LF) range are usually employed for the communication of the ID transponder with the vehicle (or with the security system of the vehicle, respectively). Authentication data can thereby be transmitted in a contactless (wireless) manner, and thereby the access data can, e.g. be verified, in order to enable an unlocking in the event of a positive authentication.

The authentication can be initiated, for example, by a user of the vehicle by pushing a button. Through such an actuation of the identification transmitter by the user, the signal with the authentication information, e.g. with access data such as a code, is sent to a vehicle-side electronics of the security system. Such systems are also referred to as Active Keyless-Entry systems (if for example a button must be pushed actively). Besides Active Keyless-Entry systems, security systems having the so-called Passive Keyless-Entry or Keyless-Go functions are used increasingly. In contrast to the conventional remote control, an active actuation of the ID transponder (i.e. without pushing a button) by the user is not required in the Passive Keyless Entry functionality. For example, if a user approaches the vehicle, or actuates a door handle, a wake-up signal can be transmitted to the identification transmitter from the vehicle via a radio connection, in particular a Low Frequency (LF) radio connection. The ID transponder will be woken up thereupon, and sends a radio signal with the authentication code to the security system of the vehicle.

It turned out to be a disadvantage that in such systems, in particular in Keyless-Go systems, elaborate security mechanisms are to be implemented to protect the vehicle, against manipulation and theft. For example, measures must be taken in order to avoid the unauthorized activation of a security function of the vehicle, e.g. the unlocking and/or the engine start of the vehicle, via a so-called "Relay station attack". This requires complex and costly measures, which allow, for example, a determination of an actual distance between the ID transmitter and the vehicle. However, a detection and evaluation of such distance information is often too imprecise, unreliable and/or can be manipulated. Furthermore, known systems are often expensive and provide only a limited comfort in the operation of the security functions.

SUMMARY OF THE INVENTION

Thus, it is an object of the present invention to at least partially remove the above-mentioned disadvantages. In particular, it is an object of the present invention to enable a more cost-efficient, safe and/or reliable activation of security functions of a vehicle. In particular, the preciseness and/or security in the distance determination and/or evaluation of the distance information is to be increased.

The above object is achieved by means of a method having the features of claim 1, by means of a mobile identification transmitter having the features of claim 14 as well as by means of a security system having the features of claim 18. Further features and details of the invention result from the respective dependent claims, the description and the drawings. Here, features and details described in conjunction with the method according to the invention naturally also apply in conjunction with the mobile identification transmitter according to the invention as well as the security system according to the invention, and vice versa, so that reference is or can always be made mutually to the individual aspects of the invention in regard to the disclosure.

This object is particularly achieved by means of a method for an in particular keyless and/or Passive Keyless-Entry and/or Keyless-Go activation of at least one security function of a preferably keyless and/or Passive Keyless-Entry and/or Keyless-Go security system of a vehicle. In particular, it is provided here that an authentication at the security system of the vehicle is performed by a mobile identification transmitter, wherein at least one of the followings steps is carried oud, preferably (chronologically) one after the other, or in any order:

a) Determining at least one distance information about a distance of a mobile identification transmitter (ID transponder) to the vehicle by means of distance determination by means of at least one, preferably wide-band, communication signal of a communication, in particular the communication between the mobile ID transponder and (in particular a communication device) of the vehicle, b) Evaluating the distance information, whereby a localization of the identification transmitter is effected dependent upon the distance information and/or the distance, preferably relative to at least one security zone of the vehicle, e.g. by a conversion of the distance information, which includes e.g. a signal transit time of the signal and/or direction information, into a distance, and/or by a comparison with a threshold value (e.g. maximum range), c) Determining a security information for the security system dependent upon the localization.

In other words, a distance determination and/or the localization is used to increase security in the authentication. In particular, the localization allows determining whether the identification transmitter is physically situated inside or outside a security zone, e.g. a first or second security zone. Preferably, in the distance determination and/or in the localization, the determination of the distance is effected as a determination of a specific distance, e.g. by a signal transit time analysis of the communication signal and/or based upon properties of the communication signal, which change dependent upon the distance.

Preferably, the determination of the at least one distance information about the distance of the mobile identification transmitter to the vehicle is effected by means of at least one, preferably wide-band communication signal of the communication in such a way that the signal transit time of the signal of at least a first or a second or a third or further, preferably wide-band communication signals is evaluated, preferably by a "time-of-flight" analysis and/or by a "ping" analysis of the at least one communication signal. The ping analysis includes, for example, the emission of one or multiple information (via the communication or the communication signal) such as data packets, which are transmitted by the sender (e.g. the vehicle, or alternatively the ID transponder). In particular, the data packets are received by the receiver subsequently (e.g. the ID transponder, or alternatively the vehicle) and/or returned, and/or a reply information is returned. The returned information (e.g. the data packet or the reply information) and/or the time period until the reception of this information is evaluated by the sender for the determination of the signal transit time of the signal or for the distance determination.

Particularly preferably, a radio distance measurement is effected for the distance determination through ultrawideband (UWB), or the communication signal as an UWB communication signal, in order to prevent a radio distance extension of an LF signal, for example. The distance determination allows determining, for example, whether a manipulation of the radio distance between the ID transponder and the vehicle or the receiver of the vehicle (such as a detection device and/or a communication device and/or a communication unit) has occurred. In particular, a (positive) security information determination for the unblocking of the activation of the security function is only effected, when the reply period is short enough, it is ensured that no radio distance extension has occurred. In this case, the evaluation of the reply time then corresponds to the localization. The reply times are in the nanosecond range, for example, e.g. in a range from 1 ns to 1000 ns, preferably 100 ns to 100 ns, and/or are selected in such a way that the ID transponder must be at a distance from the vehicle of at most 1 m or at most 2 m or at most 6 m or at most 10 m or at most 100 m (i.e. must be situated e.g. within a first or second security zone).

For example, the security information is an information for the security system which unblocks the activation of the security function, e.g. the unlocking of the vehicle. This provides the advantage that a manipulation attempt at the authentication process, e.g. an authentication via an amplification of the authentication signal over an excessively long travel path, is detected by the localization and can be prevented. In particular, the communication with the ID transponder for localization can directly be used in this case, whereby the complexity and the costs for the implementation of the localization can be reduced. The communication is effected, for example, as a first and/or second communication and/or between a transceiver of the ID transponder and a detection and/or communication device of the vehicle, wherein the detection device includes the communication device, for example. Preferably, the detection device and/or the communication device is formed as a radio communication device for radio communication.

Preferably, in the scope of the invention, a "signal", in particular the term "communication signal", means at least one information or at least a part of a data sequence such as a ping signal and the associated pong signal as a reply signal, which is transmitted via radio, for example, or, additionally or alternatively, at least one (electromagnetic, in particular radio) signal (in the physical sense) is meant, the properties of which can be evaluated, e.g. the signal intensity and/or the signal transit time of the signal. In particular, the data sequence includes at least one information such as an emitted (query information) and a received (reply information), which are transmitted successively, for example, in order to be able to determine the signal transit time of the signal (i.e. also to be able to estimate it).

Advantageously, it can be provided that the activation of the security function occurs dependent upon a security information, which is determined dependent upon the distance information, for example. For example, the security information includes an information whether the ID transponder is located within the security zone around the vehicle and/or a maximum distance between the vehicle and the ID transponder is not exceeded. Preferably, activation of the security function is effected only in the event that the ID transponder is located within this security zone and/or other conditions are given, such as the positive verification of an authentication code or suchlike. Here, the security zone extends for example around the vehicle, in particular with a certain maximum radius (starting from the vehicle or with the vehicle as a center). This enables improving security in authentication, in particular when using a keyless activation. The keyless activation particularly relates to the fact that the vehicle can be unlocked without actively using an ID transponder (e.g. the car key) and/or can be started by the very actuation of the start button. Such a keyless activation is, for example, comprised by the so-called Passive Entry/Passive Start (PEPS) functionality.

Preferably, the determination of the security information, preferably the information about the successful localization within the security zone, is a further precondition, in addition to the successful authentication by the ID transponder, for security functions that require the authentication. For example, the security function is a function that causes and/or unblocks an engine start and/or the unlocking e.g. of a central locking mechanism of the vehicle. For unlocking, a closing device of the vehicle is activated, for example.

The method according to the invention preferably serves for the keyless activation of the at least one security function of the security system, in particular of an access system, of the vehicle, preferably a motor vehicle and/or a passenger car and/or a truck and/or an electric vehicle and/or a hybrid vehicle.

Furthermore, it is conceivable that multiple security zones are provided, e.g. a first security zone and a second security zone. It can be possible here that a first security information is determined when the vehicle is located within the first security zone, and/or a second security information is determined, when the vehicle is located in the second security zone, so that by the localization of the ID transponder within different security zones, different consequences result for the security system. This allows e.g. specifying of various security levels for different security zones and/or activating comfort functions.

It can be advantageous if, in the scope of the invention, the communication, in particular a first communication, is effected between the mobile identification transmitter and a communication device of the vehicle, wherein in particular the communication signal of the communication between the mobile identification transmitter and the communication device of the vehicle is transmitted and/or the communication signal is a wide band communication signal, preferably an ultrawideband communication signal, and/or an LF communication signal and/or an HF communication signal and/or or a Bluetooth communication signal and/or an infrared communication signal. The, in particular, first communication (by means of the communication device) takes place in particular primarily and/or exclusively via ultrawideband and thus via an ultrawideband signal. Preferably, the determining according to step a) is effected through the distance determination based upon the communication signal in such a way that the communication between the mobile identification transmitter and the communication device is evaluated. For example, a signal transit time of the communication signal and/or a signal intensity is evaluated, wherein e.g. the signal intensity can also be considered for the verification of the signal transit time of the signal. This enables a reliable localization in order to increase the security in the authentication.

Preferably, it is provided that a (e.g. first and/or second) communication between the identification transmitter and the vehicle takes place, in particular via a radio connection, preferably by means of a wideband communication method, e.g. ultra-wideband. The radio signals transmittable and/or transmitted via the communication or radio connection include e.g. at least one of the following signals:
a wake-up signal,
an authentication signal,
data of a data transmission,
a distance information,
comfort information (e.g. for the control of a vehicle lighting system),
user information about the user of the vehicle and/or user-specific vehicle (pre)settings,
navigation information,
GPS information (Global Positioning System),
encryption information (e.g. an encryption code),
signals for distance determination, in particular a request information and/or a reply information.

These signals are transmitted e.g. by means of ultra-wideband technology (UWB), and are thus formed in particular as UWB signals.

Preferably, for communication (e.g. for the initiation), a first signal transmission occurs via a first communication, and subsequently (e.g. as a reply) a second signal transmission occurs via a second communication, wherein the radio frequencies and/or the communication type of the first communication and the second communication are different. Furthermore, it can be provided that the communication enables a localization (e.g. of the ID transponder). Thus, the communication, in particular according to the UWB technology, enables an encrypted and/or highly-precise and/or readout-proof localization of for example the ID transponder. The localization is preferably based on a "time-of-flight" measurement, in particular under "line-of-sight" conditions, wherein the speed of light and/or the communication speed of the communication is considered for the localization and/or evaluation. Particularly preferably, localization is effected with a resolution and/or preciseness in the range of 1 cm to 100 cm, preferably 10 cm to 50 cm, particularly preferably 5 cm to 15 cm. The "line-of-sight" conditions particularly means that the transmission of the radio signals (for example only or exclusively) takes place with and/or in direct visual contact between transmitter and/or receiver. For example, security can be increased in that the (first and/or second) communication takes place only under "line-of-sight" conditions.

Transmitter and/or receiver of the (first and/or second) communication are preferably a communication device and/or detection device of the vehicle as well as a transceiver of the ID transponder. The detection device is preferably a distance measuring device of the vehicle, i.e. a device that (directly) allows the determination of the distance (e.g. between ID transponder and vehicle) and/or the reception of the distance information. In particular, the communication device and/or detection device is connectable to a processing device electrically and/or via radio, wherein e.g. further steps for distance determination and/or evaluation of the distance determination or distance information take place via the connection and/or the processing device. The communication device and/or detection device and/or processing device and/or the ID transponder preferably includes one or multiple electronics components, e.g. integrated circuits and/or microprocessors and/or ASICs (application specific integrated circuits) and/or digital signal processors and/or correlation receivers and/or the like, in order to, for example, evaluate and/or generate the distance information by means of arithmetic information.

Preferably, the vehicle is configured as a motor vehicle or passenger car, or as a truck or as an electric vehicle or as a hybrid vehicle. The security system preferably includes an access system and/or a central locking mechanism and/or a locking device and/or a closing system of the vehicle and/or is electrically connected to the electrically-controllable door locks and/or closing elements for example for automatically opening the trunk lid or for locking the doors of the vehicle. Preferably, the vehicle comprises a control unit, which is connected to the onboard electronics. The control unit can perform the authentication process or the authentication request with the ID transponder. Here, the control unit can be directly arranged in the locking device, or in another relevant place of the vehicle. In particular, provision is made for that in the case the authentication be negative, no change of the state of the locking device is effected. This effectively prevents that unauthorized persons bring the locking device into the unlocked state. Advantageously, the access control system is connected to a closing system, which can, inter alia, lock and unlock the vehicle doors, rear trunk lid, and the like. Upon a positive authentication, the vehicle door and/or the trunk lid are unlocked, so that the user (operator) can actively open the door, trunk lid.

Furthermore, it is conceivable that the localization and/or distance information can be evaluated by a further external device. In particular, it can be provided that the ID transponder and/or the vehicle includes an interface, which can be connected to the external device electrically and/or via radio, wherein a (data) transmission, in particular of the distance information or an information dependent thereupon, occurs in particular via the interface. Preferably, the transmitted (distance) information is used to display or output information to a user of the external device based thereupon, which information enables finding the ID transponder.

Preferably, the first and/or second communication is carried out by means of the ultra-wideband (UWB) technology. Communication by means of UWB is based in particular on the technical thinking through that the channel capacity increases linearly with the bandwidth of the transmitted signaler and logarithmically with its power. For example, in communication technologies such as Bluetooth, the available bandwidth is narrow and constant. By contrast, UWB uses a very wide frequency range, in order to enable high channel capacity at reduced transmission power. This provides the advantage that a data transmission can be effected at a very low power consumption through the (UWB) transmitter. The maximum power output of an UWB transmitter, such as the (first and/or second) communication unit, is 1 mW, for example.

In particular, a multiplexing method, preferably a frequency multiplexing method such as an Orthogonal Frequency Division Multiplexing (OFDM) and/or a code multiplexing method such as a Code Division Multiple Access method, in particular a Direct-Sequence-Code Division Multiple Access (DS-CDMA) is employed for communication, e.g. for the first and/or second communication, in particular for the data transmission. Preferably, pulse-type signals are wirelessly transmitted for the transmission of signals and/or data. Here, a shifting of the pulses by means of (pseudo)random values is effected, wherein then (UWB) transmitters and (UWB) receivers consider the same values for the shift. Preferably, prior to or at the start of the transmission of signals and/or data, a temporal synchronization of (UWB) transmitter and (UWB) receiver is effected. Transmitter and/or receiver, in particular UWB transmitter and/or UWB receivers can be and/or include, for example, a (first and/or second) communication unit and/or the associated communication interfaces and/or a communication device (of the vehicle) and/or a transceiver and/or a (first and/or second) transceiver (of the ID transponder). For the evaluation of the received signal, the (UWB) transmitter and/or the (UWB) receiver includes e.g. electronic components such as comparators for the comparison of received pulses and/or correlation receivers and/or integrated circuits and/or microprocessors and/or electronic components for performing a Fast Fourier Transformation.

The transmission of a distance information and/or the communication of the ID transponder with the vehicle and/or the security system of the vehicle, in particular the data transmission of security-relevant data, and/or the distance determination, in particular by means of UWB, preferably occurs in an encrypted manner. To that end, cryptographic security mechanisms such as RSA are employed, which, for example, include connection keys and/or authentication mechanisms and/or the use of secret (private) and public keys and/or a symmetric and/or asymmetric cryptographic system and/or a hybrid encryption. Thus, the advantage that a secure and reliable transmission is possible, is achieved.

The communication via the wideband communication method, preferably via UWB, and/or by means of the wideband communication signal, is preferably effected via at least one large frequency range, preferably with a (total) bandwidth of (at least) 500 MHz to 900 MHz and/or (at least) 3.5 GHz to 10 GHz and/or at least 5 GHz and/or at least 2 GHz and/or at least 1 GHz and/or at least 500 MHz and/or at least 40% and/or at least 30% and/or at least 20% and/or at least 10% of the arithmetic mean value of the lower and upper limit frequency of the user frequency band. The total bandwidth can be composed of the bandwidth of the individual frequency bands, which are commonly used for communication, or related to the bandwidth of one single frequency band used for communication. For example, the frequency range in the range from 0 to 40 GHz, in particular 500 MHz to 900 MHz, preferably 3.5 GHz to 10 GHz, preferably 3.5 GHz to 6.8 GHz, preferably 20 MHz to 11 GHz, particularly preferably 30 MHz to 10.6 GHz, and/or 22.0 GHz to 26.7 GHz and/or 1 MHz to 12.4 GHz and/or essentially 700 MHz can be used. Furthermore, it can be provided that the maximum mean value of the spectral power density for the (UWB) communication is in the range between −90.0 dBm/MHz and −20.0 dBm/MHz, preferably maximally −41.3 dBm/MHz. The data transmission rate for the data transmission is preferably at least 1 Mbit/s or at least 4 Mbit/s or at least 6 Mbit/s, in particular no more than 6.8 Mbit/s or 10 Mbit/s. Thus, a quick and interference-proof transmission is possible.

Preferably, pulses are sent for the (in particular UWB) communication. The distance between the pulses can expediently be greater than the pulse length by magnitudes.

It is conceivable here that a pulse width modulation technique and/or a pulse phase modulation technique are used for the data transmission. This ensures a quick, reliable and/or secure data communication.

It can further be provided that according to the UWB communication, also the distance determination is effected by means of a distance measurement such as a signal transit time analysis of a (UWB) radio signal. In particular, a frequency range from 22.0 GHz to 26.6 GHz can be used here. The mean frequency can e.g. be in the frequency range from approx. 1 GHz to 15 GHz, and a frequency bandwidth of at least 500 MHz can be provided.

Furthermore, it can be possible in the scope of the invention that the transceiver of the ID transponder receives a signal from the vehicle (e.g. from an onboard security system and/or the communication device) via a radio connection, and preferably is or can be connected to a processing unit such that the signal received via the radio connection by the transceiver, in particular a wake-up signal and/or an information for distance determination, can be evaluated by the processing unit. It is conceivable here that the radio connection is a first radio connection of a first communication (such as a UWB radio connection) of a first transceiver and/or a second radio connection of a second communication (such as a LF and/or HF radio connection) of a second transceiver unit if the transceiver. In particular, the transceiver and/or the processing unit can be woken up because of the reception of the signal. In this case, waking-up particularly relates to the activation of functions and/or components of the ID transponder or also the change from the sleep mode to the operating mode, e.g. with a higher energy consumption. The (wake-up) signal can, in particular, trigger communication of the ID transponder with the security system.

In particular, the (vehicle-sided) security system can comprise an access system (e.g. central locking mechanism for the vehicle doors), which has Active-Keyless-Entry, Passive Keyless Entry or Keyless Go functionality. The security system serves for example for the keyless activation of at least one security function, in particular an access system of the vehicle, in particular motor vehicle. To that end, in particular an authentication process and/or a distance determination (with positive result) initiated by the (wake-up) signal or following the reception of the (wake-up) signal is required for activation. The positive result relates, for example, to a successful code verification and/or code conformance in the authentication and/or a distance of the ID transponder to the vehicle determined by the distance determination, which must be less than a maximum distance. The authentication process allows activating functions, in particular security functions, of the security system of the vehicle, e.g. an opening or closing of a closing device of the vehicle, e.g. also doors and lids in the rear and/or side region of the vehicle, a starting of the engine/motor or an activation or deactivation of the immobilizer system.

The (wake-up) signal is sent, for example, by at least one onboard communication device and/or detection device of the security system. To that end, e.g. communication parts, in particular antennas, can be provided in different areas of the vehicle, e.g. outside the vehicle, in the interior space, at the doors, in particular door handles, on the roof, the rear side, and/or the side region of the vehicle, or in the trunk. In the event that the (wake-up) signal is transmitted via a UWB and/or LF radio frequency, the range is strongly limited and is also strongly attenuated by the vehicle body and/or (completely) shielded-off. This e.g. also allows a distance determination. This also allows that a device receiving the (wake-up) signal (e.g. an ID transponder) can be localized inside or outside the vehicle, and preferably the localization inside the vehicle can be discriminated from the localization outside the vehicle. As a support, it is also possible that another method for distance determination is used, such as an evaluation of the signal intensity or signal transmit time ("time-of-flight"). After the localization and/or the reception of the signals and/or the distance determination (in a positive result), e.g. an authentication process is initiated, which particularly includes the sending of a reply signal to the security system, wherein the reply signal can contain a code (access code) for identification verification. The reply signal is received and evaluated e.g. by the onboard communication device or by another onboard electronics. Preferably, a UWB and/or LF antenna which is capable of receiving the (wake-up) signal from the vehicle is provided in the ID transponder, in particular in the transceiver of the ID transponder and/or the (first and/or second) transceiver. An antenna of the ID transponder, e.g. a UWB and/or LF antenna, can be provided for the reception, and a separate or the same antenna can be provided for the transmission of signals.

Further preferably, communication parts can be provided, which include in each case one or multiple antennas, in particular UVB antennas. It is conceivable here that for the (in particular UWB) communication, a MIMO method is provided, so that multiple sending and/or receiving antennas are used. For example, a signal processing for the signals received by the antennas is provided. Preferably, the communication parts are arranged on the vehicle in such a way that the implementation of a MIMO method is enabled.

It is also conceivable that the communication part, in particular the respective antenna, is formed in such a way that the type of construction and/or the antenna parameters and/or the antenna construction and/or the length and/or the extension of the antenna is adapted to the UWB method and/or the (in particular UWB) bandwidth used for the communication. Thus, it is possible that at least one of the respective antennas is configured as a linear antenna and/or as a flat-top antenna and/or as an antenna array. In particular, the length of the antenna is adapted to the center frequency and/or pulse length used for communication. The antenna construction can be, in particular, a UWB-specific construction type, e.g. a Rugby-Ball antenna, or in a Tapered Slot construction type.

Preferably, the communication part, in particular the antenna, can comprise a planar metal structure and/or at least one waveguide. Furthermore, it is conceivable that the communication part/the antenna is configured in such a way that a sending and/or receiving of high frequency (HF) signals can be performed. The antenna can be formed as an omnidirectional antenna, for example. Likewise, the communication part or the antenna can have a directivity and include, to that end, at least one dipole element, in particular a three-dimensional dipole element.

Further preferably, a data transmission can be effected in such a way that a UWB specific modulation type is used. Such type of modulation is, for example, a pulse width modulation and/or a pulse phase modulation. Furthermore, it is conceivable that the information of the data transmission is modulated onto a communication signal by means of an encoding of the polarity and/or the amplitude and/or the direction of pulses (sent by the communication). To that end, orthogonal pulses can be used, for example.

Optionally, it can be possible that the communication is effected as a first communication via the communication signal as a first communication signal and a second communication via a second communication signal, wherein the second communication signal has a different and/or lower frequency bandwidth that the first communication signal. In particular, the first and/or second communication is effected between the mobile identification transmitter and a communication device of the vehicle. Preferably, the second communication signal is a signal different from an ultrawideband signal. Preferably, in the second communication a different type of signal encoding and/or signal encryption and/or multiplexing is effected as the one(s) in the first communication. Particularly preferably, the first communication and the second communication are simultaneously available for communication, i.e. data can be exchanger essentially simultaneously and/or independently from one another both via the first and via the second communication. This provides the advantage that alternative options are available for communication.

It is optionally also conceivable that the distance determination according to step a) is effected by an evaluation of the communication signal and/or the communication by the vehicle, in particular by a central processing device and/or by a detection device, wherein preferably the detection device comprises a communication device for the detection of the communication signal. The central processing device is a central vehicle electronics, for example. In particular, the detection device and/or communication device is connected to the processing device via a transmission system. The detection device and/or the communication device and/or the processing device preferably includes electronic components for the decryption and/or decoding and/or evaluation of the communication signal. The evaluation preferably occurs for the distance determination and/or localization. The communication device is configured as a UWB communication device, for example, in order to enable e a reliable and very precise localization.

Furthermore, it is optionally provided that the determination of the distance information and/or the distance determination according to step a) (e.g. through an evaluation of the communication signal) is performed by the identification transmitter, wherein preferably the following step is provided, in particular (e.g. temporally) after step a):

detection, in particular receiving, the distance information by a detection device of the vehicle, wherein preferably the detection device comprises the communication device.

Accordingly, it can be provided that the determination of the distance information and/or the distance determination is performed, e.g. exclusively by the identification transmitter, wherein preferably the identification transmitter determines the distance between the vehicle and the identification transmitter. Alternatively or additionally, it is conceivable that both the identification transmitter and the detection device and/or the communication device and/or the processing device of the vehicle perform the distance determination and/or determination of the distance information, e.g. independently from one another or commonly. This allows increasing the accuracy and/or verification and/or a redundancy in the distance determination, for example.

According to an advantageous development of the invention, it can be provided that the distance determination of step a) is effected by a determination of a signal transit time in particular of the at least one communication signal, and in particular the security function of the vehicle is activated only in the case that and/or the authentication takes place, when the signal transit time is below a predefined threshold. Preferably, it can be provided that the distance information and/or the distance comprises such an information about a distance between the identification transmitter and the vehicle, that this information such that this information is present as a time information (e.g. signal transit time) and/or as a metric information. In particular, the security function of the vehicle is activated only in the case that and/or the authentication is performed and/or a (positive) security information is determined only in the case that the signal transit time of the signal is below the threshold as a maximum value, which corresponds, for example, to a security distance of the ID transponder from the vehicle of at most 0.5 to 10 m, in particular at most 4 to 6 m, preferably at most 1 to 2 m. Through this limitation of the maximum distance, i.e. the determination of the threshold value, in particular manipulations in the authentication process can be detected and/or prevented.

It is further conceivable that the localization and/or the determination of the signal transit time, i.e. in particular a signal transit time analysis, is stopped during the distance determination, when a reply signal, which serves e.g. for the determination of a signal transit time analysis, is absent. For example, the distance determination is performed by a time-of-flight-analysis of the communication signal, e.g. a radio signal. In particular, the distance determination and/or the determination of the distance information and/or the determination of the distance is performed by a processing unit of the identification transmitter and/or by the processing device of the vehicle. For the determination of the signal transit time and/or for the signal transit time analysis, e.g. a first signal, in particular a query signal, is emitted via the (e.g. first and/or second) communication, which should be received by the ID transmitter for example, and subsequently as second signal, e.g. a reply signal, is awaited. The communication signal includes e.g. the first signal and/or the second signal and/or a first communication signal is provided as the first signal and/or a second communication signal is provided as a second signal (e.g. reply signal). In particular, the communication signal means a radio connection so that in an existing radio connection, it is also conceivable that merely a first information as a first signal and a second information as a second signal (e.g. reply signal) are transmitted via the only (existing) communication signal (corresponding to the radio connection). As a matter of fact, a combination of these methods is likewise conceivable, in order to use various communication signals, for example in a malfunctioning connection and/or connection interruptions.

It is optionally provided in the scope of the invention a first query signal is emitted via a first communication as well as a second query signal is emitted via a second communication (e.g. for distance determination and/or authentication), preferably simultaneously or successively, wherein in particular the first communication is different from the second communication with respect the respective type of communication (communication technology). The first communication is configured as a UWB or Bluetooth communication, for example, and the second communication is configured as an LF or HF communication. By the emission of the query signal via both communication types, it can be ensured, for example, that an ID transponder which only supports the second communication and/or does not support the first communication, nevertheless receives the second query signal and/or, as a reaction to it, emits a reply signal via the second communication. The further course of communication for authentication and/or distance determination is then continued via the communication, via which the reply signal has been received.

Furthermore, it can be provided in the scope of the invention that for a signal transit time analysis is performed for distance determination of step a), wherein at least one of the following steps is provided:
  emitting a query information (query signal) via the communication, in particular via the communication signal, e.g. via UWB, preferably by a communication device of the vehicle, in particular by a first communication unit of the communication device or by a transceiver, preferably by a first transceiver unit, of the ID transponder,
  receiving the query information, preferably by a transceiver of the identification transmitter or by the communication device of the vehicle,
  emitting a reply information (reply signal) via the communication, in particular via said or a further communication signal, i.e. e.g. via UWB, as a reply to the query information, preferably by the transceiver or by the communication device of the vehicle,
  receiving the reply information, preferably by the communication device or by the transceiver of the ID transponder,
  determining a signal transit time of the signal, in particular between a first point of time of the emission of the query information and a second signal transit time of the signal of the reception of the reply information,
  determining the distance information based upon the signal transit time of the signal.

In particular, in the scope of the invention, the communication signal means, in a broader sense, a type of communication, such as UWB, via which the communication takes place. In addition, the communication signals means, in a narrower sense, in particular that the communication signal is a signal (such as e.g. an electromagnetic wave) of a certain type of communication and/or a connection of the communication. Furthermore, in particular, the communication signal can be understood as a signal in the sense of an information and/or data, which is transmitted via the communication. It is conceivable here that the temporal duration between the emission of the query information via the communication signal, e.g. as a first communication signal, and the reception of the query information is evaluated as a first signal transit time of the first communication signal. Furthermore, it is conceivable that the temporal duration between the emission of the reply information via a further communication signal, in particular a second communication signal, and the reception of the reply information can be regarded a second signal transit time of the second communication signal. The processing of the first and second signal transit time of the signal for the determination of the entire signal transit time and thus indirectly the distance between ID transponder and vehicle corresponds in particular to the determination of the distance information (via the distance by the distance determination by means of the first and second communication signal).

Alternatively, even e.g. only one (in particular one single) signal transit time of the signal can be determined, which is processed for the determination of the distance information and/or of the distance. In this case, e.g. the latency between the reception of the query information or the emission of the reply information (e.g. by the processing by means of the ID transponder and/or the detection device and/or the communication device of the vehicle) is neglected. Further, as the case may be, it is possible that the said latency is considered in such a way that the time needed for the processing (e.g. by the ID transponder or by the vehicle) is known in advance and can thus be included in the determination of the signal transit time. The query signal corresponds to the "ping" signal, and the reply signal corresponds to the "pong" signal here.

It is provided, for example, that the query information comprises an identifier (e.g. a digital and/or unique code), which enables an identification of the query information and/or a discrimination from further signals or information. Thus, it is conceivable, for example, that (e.g. depending on the query information) the reply information also receives a reply identifier (e.g. at the latest during the emission by the ID transponder or the vehicle), which is preferably identical to the identifier of the query information. The determination of the reply identifier and/or the association with a reply information preferably occurs depending on the identifier of the query information, the reception of which has caused the emission of the respective reply information. Thus, an identification of the reply information associated with a query information is possible in order to determine a signal transit time of the signal. Preferably, the query information and/or the reply information are transmitted in an encrypted manner.

Furthermore, it is conceivable in the scope of the invention that a signal transit time analysis is effected for the distance determination according to step a) in that a time-critical evaluation of a signal transit time of a signal, in particular of the communication signal, is ensured within a predetermined time period, wherein the evaluation of the signal transit time analysis is implemented only by hardware and/or software-invariant and/or real-time-capable. The evaluation can be performed in a real-time capable manner e.g. in that the evaluation for signal transit time analysis is effected by an adapted software and/or an adapted hardware in such a way that the signal transit time is effected with a predetermined accuracy and/or resolution (e.g. of at most the predetermined time period). The predetermined time period is, for example, in a range of at most 1 ns to 20 μs, preferably 10 ns to 10 μs, preferably 100 ns to 1 μs. As a result, the reliability of the distance determination and thus the security for the operation of the vehicle is increased. In particular, it can be provided that the hardware and/or software is adapted in such a way that no undefined time steps occur in the distance determination.

It is conceivable that the first and/or second communication is effected via (the communication type) Bluetooth Low energy, e.g. as a bidirectional communication between the ID transponder and the vehicle. In particular, the ID transponder emits an authentication signal and/or a query signal via the first and/or second communication in a cyclic and/or repeated manner, wherein preferably the vehicle (e.g. the communication device) receives the query signal and emits a reply signal via the first and/or second communication, in order to in particular perform the distance determination. In particular, a distance determination and/or a localization by means of LF radio and/or GPS takes place simultaneously.

In particular, the term Bluetooth also refers to Bluetooth Low Energy in the scope of the invention.

According to another advantage, it can be provided that the first and/or second communication is or comprises a communication connection which is preferably maintained for as long as a predefined maximum range is reached. Preferably, after exceeding the maximum range, the communication connection is in particular actively disconnected (e.g. by the communication device and/or the transceiver). In particular, the first or second security zone is defined by the maximum range. The first security zone forms e.g. an outer security zone. It is preferably provided that the vehicle emits a low-frequency magnetic field when entering the second security zone, in order to thereby establish a further (communication) connection to the ID transponder. To that end, e.g. further devices are activated when entering (e.g. a second communication unit and/or a second transceiver unit). In particular, the localization within this second security zone is verified by (a distance determination using) Bluetooth Low Energy field intensity values. The second security zone forms a medium security zone, for example. Preferably, also a third security zone is provided as a near zone, wherein the transmission power and/or evaluation of the received field intensity (e.g. in the distance determination) is limited for the determination of the maximum range of the near zone.

In particular, a distance determination is effected in the near zone (e.g. having a radius of at most 10 m or at most 5 m or at most 2 m) by means of a first or second communication via a high-frequency wideband communication signal, in order to thus prevent multipath propagations, for example. In particular, the distance information is determined by the ID transponder itself, i.e. e.g. also the decision whether the ID transponder is situated within the corresponding security zone.

Preferably, it is provided that at least first communication parts, in particular UWB antennas, and at least second communication parts, in particular LF or HF antennas, are provided. In particular, the first communication parts serve to support the localization using LF or HF by the additional localization and/or distance determination using UWB, and thus to also reduce e.g. the number of the LF or HF-emitting oscillating circuits. The localization allows locating the ID transponder, e.g. also outside the security zones, for example.

In particular, it can be provided in the scope of the invention that the communication is performed by a first communication in a first frequency range and by a second communication in a second frequency range, wherein preferably the first frequency range has a larger bandwidth than the second frequency range, and particularly preferably has at least two times or three times or four times the bandwidth thereof. The communication includes, for example, some or all signals exchanged between ID transponder and the vehicle, e.g. authentication data and/or distance determination data, such as the query information and/or the reply information (ping and pong signals). Thus, it is conceivable here that the authentication data is transmitted (in particular only) via the second communication, and the query information is only or also transmitted via the first communication, for example. Alternatively or additionally, it can be provided that the first communication is effected between a first communication unit of the communication device of the vehicle and a first transceiver unit of the identification transmitter, and preferably a second communication is effected between a second communication unit of the communication device of the vehicle and a second transceiver unit of the identification transmitter. Preferably, the first frequency range of the first communication (significantly) differs from the second frequency range of the second communication, i.e. in particular different frequency bands are provided. It is likewise conceivable that the first communication is configured for a first localization and the second communication is configured for a second localization, in order to increase reliability and/or redundancy in the localization, for example. The first and/or second communication is preferably configured as a radio communication, so that the frequency ranges in particular relate to the frequencies of the electromagnetic waves used for the communication.

Furthermore, it can be provided in the scope of the invention that a first localization is effected for example using a first communication, e.g. via Bluetooth and/or Bluetooth Low Energy and/or Ultrawideband signal, and preferably a second localization is effected using a second communication, which is different from the first communication with respect to the type of communication (communication technology such as Bluetooth). Preferably, the first localization enables a localization relative to the first security zone and/or the second localization enables a localization relative to the second security zone and/or for the verification of the first localization and/or for the localization with higher precision. Accordingly, a first distance determination for determining a first distance information can be performed by means of the first communication, and a second distance determination for determining a second distance information can be performed by the second communication, for example. Preferably, the first security zone has a smaller radius than the second security zone or vice versa.

In the scope of the invention, features that have been described with respect to the first communication naturally also apply to the second or a further communication and vice versa. Thus, it is likewise possible that the second communication is configured as the UWB communication, and that the first communication is configured as the HF or LF or Bluetooth communication.

Optionally, it can be provided that a first transceiver unit of the ID transponder serves for the first communication with the first communication unit of the communication device in particular by means of a first communication technology, e.g. Bluetooth or UWB, and/or a second transceiver unit of the ID transponder serves for the second communication with the second communication unit of the communication device, in particular by means of a second communication technology, e.g. LF or HF. Particularly preferably, the first communication technology is a Bluetooth technology or an ultrawideband technology or a HF (High Frequency) technology or an LF (Low Frequency) radio technology. Particularly preferably, the second communication technology is a Bluetooth technology or an ultrawideband technology or an LF technology or a HF technology. This allows various options for the transmission of data and/or distance determination via various types of communication. In particular, it is provided that the extension of the security zone, preferably the first and second and/or further security zones, preferably of a radius of the security zone, depends upon the communication technology used for the localization and/or distance determination for the corresponding security zone.

Moreover, it can be of advantage in the scope of the invention that a first or second communication unit of the communication device of the vehicle and/or a first or second transceiver unit of a transceiver of the identification transmitter emits an initiation information for initiating the communication between the identification transmitter and the communication device in a cyclic manner and/or repeatedly. This enables to reliably perform the first and/or second communication.

Another advantage can be achieved in the scope of the invention if, by the evaluation of the distance information, the localization of the identification transmitter in relation to at least one security zone of the vehicle is effected dependent upon the distance information, wherein the extension of the security zone is adjusted in that and/or the distance determination is performed in that the transmission and/or receiving power of a transceiver, in particular of a first transceiver unit, of the identification transmitter is adjusted, and/or the transmission and/or receiving power of the communication device of the vehicle, in particular of a first communication unit, is adjusted. This achieves the advantage that the determination of the distance, e.g. by means of the maximum reception range, can be performed in a simple and cost-efficient manner.

It is further conceivable that the following step is provided, preferably prior to the initiation of the communication:

monitoring for an initiation signal, in particular wake-up signal, and/or emitting an initiation signal, in particular in a cyclic manner, in particular by a communication device of the vehicle and/or a transceiver of the identification transmitter.

Preferably, the initiation signal is a first communication signal, wherein e.g. the distance determination is performed by means of the initiation signal. Particularly preferably, the authentication and/or distance determination (and/or determination of the distance information e.g. by the ID transponder) is initiated by the reception of the initiation signal (e.g. by the ID transponder). This enables a reliable localization and energy saving in the distance determination.

Advantageously, it can be provided in the scope of the invention that an initiation signal (for initiating an authentication) is evaluated in the distance determination. Thus, it can be provided, for example, that the distance to the ID transponder can also be determined just with the reception of the initiation signal by the vehicle. This is possible, for example, when the ID transponder regards the initiation signal as a query signal and thereupon transmits a reply signal to the vehicle. Alternatively or additionally, it can be provided that due to the reception of the initiation signal by a first communication, a second communication is activated, in order to perform the distance determination thereby. For example, a query signal is emitted via the second communication by the ID transponder, when the initiation signal has been received via the first communication, and/or subsequently the reception of a reply signal is awaited.

Another advantage can be achieved in the scope of the invention if a first communication is initiated via the communication signal as a first communication signal dependent upon a second communication via a second communication signal, wherein preferably the first communication is initiated by the reception an initiation information, in particular of the second communication signal, by the identification transmitter. This enables, for example, that the initiation information and/or an initiation signal is first transmitted via an energy-saving type of communication (e.g. HF or LF), and then activate a further communication, such as the second communication, which has a higher energy consumption, for example. For example, the first communication is configured as an HF or LF communication here, and the second communication is configured as an UWB or Bluetooth communication.

Advantageously, the invention may provide that a distance determination is effected by a first communication by means of a run-time analysis and/or a signal intensity, in particular of a first communication signal, and by a second communication by means of a signal intensity and/or range limitation, in particular of a second communication signal. The range limitation is achieved, for example, in that a second communication unit and/or a second transceiver unit is reduced with respect to the transmission and/or receiving power. Thus, a simple and cost-efficient distance determination is possible.

Furthermore, it is conceivable that the first and/or second communication is initiated dependent upon the localization of the identification transmitter in the (e.g. first and/or second) security zone and/or further security zones, wherein in particular the following steps are provided, preferably (e.g. temporally) prior to step a):

Initiating a first communication for the distance determination and/or determination of a first distance information when an initiation information is received e.g. by the detection device and/or by the transceiver, and in particular only in the case that the identification transmitter is localized within a first security zone, Initiating a second communication for authentication and/or distance determination, in particular only in the case that the identification transmitter is localized within a second security zone based upon the (e.g. first and/or second) distance information.

Thus, it is conceivable that first a "simplified" distance determination within the first security zone is effected, and not before entering the second security zone, an e.g. improved and/or secure and/or forgery-proof distance determination is effected by the second communication. It can be possible here that the second communication is maintained, in particular as long as the identification transmitter is localized in the second security zone and/or the first security zone, preferably when at the same time verifying the localization by means of the first communication. It can optionally also be possible for the first communication to be maintained as long as the first identification transmitter is localized to be within the first security zone.

Furthermore, it is conceivable here in the scope of the invention, that a first security zone and/or a second security zone each extend around a region surrounding the vehicle, preferably in each case with a maximum radius of 1 m to 150 m, preferably 2 m to 100 m, particularly preferably 3 m to 10, in particular 4 m to 6, and/or 1 m to 8, preferably 2 m to 4 m. In particular, the maximum radius of the first security zone can be different from the radius of the second security zone. Particularly preferably, the second security zone has a smaller extension than the second security zone, wherein in particular the maximum extension and/or the maximum radius of the first security zone is determined dependent upon the maximum range of the first communication. In particular, the vehicle is the center of the respective security zone. Preferably, the security zone does not form an exact circle and/or does not have a constant radius, but instead the shape of the extension is influenced by the surroundings of the vehicle, for example. In particular, it is conceivable that the security zone is also determined in that a visual connection between the sender (e.g. vehicle) and receiver (e.g. ID transponder) must be present.

It is further conceivable that both a first communication and a second communication is effected via UWB, wherein the parametrization of the first (UWB) communication is different from the parameterization of the second (UWB) communication. Thus, the frequency ranges and/or the range of the first and second (UWB) communication can be different from one another so that e.g. even differently configured security zones are provided for the respective communication.

In addition, it is advantageous when the first and/or second communication is performed in an encrypted and/or forgery-proof manner between the identification transmitter and the vehicle, wherein preferably the data and/or the distance information transmitted through the communication is encrypted. Preferably, besides an encryption and/or forgery-proof communication, a further encoding of the data and/or distance information is effected. Preferably, the term "encryption" of e.g. the data and/or a "forgery-proof" communication particularly relates to a security function for the prevention of an intentional manipulation of the transmission or data. Hereby, in particular, the terms "encryption" and "forgery-proof" are discriminated from other encoding and/or control and/or error correction methods for the prevention and/or recognition of wrong or faulty transmissions (due to transmission errors such as noise). Preferably, the terms are also discriminated from encodings that are (exclusively) used to enable data transmission (character encoding, multiplexing, spreading codes, etc.), in particular if these are only used for the transmission and not for the protection against manipulation. An intentional manipulation here particularly relates to the unauthorized intentional alteration of the data transmission caused by a person.

Likewise subject-matter of the invention is a mobile identification transmitter (ID transponder) for an activation of at least one security function of a security system of a vehicle and/or for the authentication of a security system of a vehicle and/or for the authentication of a security system of the vehicle, wherein a wireless communication between the identification transmitter and a communication device in the vehicle can be performed. In this case, it is provided that a transceiver is provided, wherein a determination of at least one distance information about a distance of the mobile identification transmitter to the vehicle can be performed through a distance determination by means of a communication signal by the transceiver. Thus, the identification transmitter according to the invention provides the same advantages as have been described in detail with respect to the method according to the invention. In addition, the mobile identification transmitter can be suitable to be operated in accordance with a method according to the invention.

Furthermore, it is optionally possible in the scope of the invention that the transceiver includes a first transceiver unit and a second transceiver unit, wherein the first transceiver unit comprises an ultrawideband interface and/or a Bluetooth interface and/or a Bluetooth Low Energy interface, and preferably the second transceiver unit includes a Bluetooth and/or Bluetooth Low Energy and/or LF and/or HF interface. Alternative or additionally, it is conceivable that both the first and the second transceiver unit comprise an ultrawideband interface and/or both the first and the second communication unit of the vehicle comprise an ultrawideband interface, which are e.g. parameterized differently.

It is further conceivable that the identification transmitter includes an encryption unit, whereby preferably an encrypted transmission of the distance information to the communication device can be performed. It can be provided that the encryption unit includes a decryption unit and/or that a decryption unit of the mobile identification transmitter is provided in addition to the encryption unit. Furthermore, it can also be provided that an encrypted transmission of one or more authentication information (such as codes, for example) to the security system can be carried out.

Likewise subject-matter of the invention is a security system for a vehicle, in particular for a keyless activation of at least one security function.

It is provided here that the security system includes at least:

a mobile identification transmitter, in particular a mobile identification transmitter according to the invention, for the authentication at the security system, a communication device of the vehicle for the communication with the identification transmitter via at least one communication signal a distance determination device for determining at least one distance information about a distance of the mobile identification transmitter to the vehicle by means of a distance determination by the communication signal.

Thus, the security system according to the invention provides the same advantages as have been described in detail with respect to the method according to the invention and/or with respect to a mobile identification transmitter according to the invention. In addition, the security system can be suitable to be operated in accordance with a method according to the invention.

It is also optionally conceivable that the communication device comprises at least two communication units at the vehicle, wherein a first communication unit is configured as an ultrawideband interface and/or Bluetooth interface and/or Bluetooth Low Energy interface, and preferably a second communication unit is configured as a Bluetooth interface and/or Bluetooth Low Energy interface and/or LF and/or HF interface. Alternatively or additionally, it is conceivable that all communication units and/or transceiver units of the ID transmitter each comprise one interface that supports an identical type of communication, wherein merely e.g. the parametrization and/or activation is different. It is conceivable here that the first and second and/or further communication unit are each connected to the same or different communication parts. Thus, a further reduction of costs is possible in the manufacture of the security system according to the invention.

Furthermore, it is optionally provided that a detection device includes a communication device for the communication with the identification transmitter with at least two communication units on the vehicle. It is also conceivable that further communication units such as e.g. a third and/or a fourth communication unit are provided on the vehicle. Preferably, the communication units enable communication with in each case different types of communication. Thus, a first communication is possible through the first communication unit, and a second communication is possible through the second communication unit, wherein the first communication differs from the second communication with respect to the type of communication. This enables, for example, the increase of being safe from interception and/or the increase of reliability.

Advantageously, it can be provided in accordance with the invention that a second communication unit of the vehicle includes a Bluetooth and/or LF and/or HF communication interface, which is at least partially different from the communication interfaces of a first communication unit of the vehicle. In particular, the first communication unit of the vehicle includes at least one of the following communication interfaces: Bluetooth, Bluetooth Low Energy, Ultra-Wideband, or the like. Preferably, communication, in particular the first and/or the second communication is a bidirectional communication between the ID transponder and the vehicle. Preferably, the (first and/or second and/or a Bluetooth and/or Bluetooth Low Energy) communication unit serves as a communication interface to the ID transponder, or also as a gateway and/or for the data transmission of vehicle information to the ID transponder and/or for the realization of comfort functions, such as finding the ID transponder via RSSI (Received Signal Strength Indicator) values of the BTLE (Bluetooth Low Energy) Advertising/Connected Telegrams. The gateway serves, for example, for the transmission of information from e.g. third party devices, such as a cell phone, to the vehicle (e.g. via Bluetooth or Bluetooth Low Energy).

Preferably, a communication is established as a communication connection upon and/or after the receipt of an initiation signal by the ID transponder and/or the communication device, and preferably maintained as long until the determined distance reaches and/or exceeds a maximum range between the ID transmitter and the vehicle (or the communication device). In particular, a first or second or third security zone is defined by the maximum range. The query for receiving the initiation signal is performed in y cyclic manner, in order to enable energy savings.

Preferably, a distance determination is effected both by means of a first communication, e.g. LF communication, and by means of a second communication, e.g. UWB communication, in particular by means of the corresponding first and second communication signals. In particular, e.g. when the ID transponder is situated within the first and/or second security zone, the first or second communication is used in order to support and/or improve and/or verify the localization by the respective other second or first communication.

According to another advantage, it can be provided that a transmission system of the vehicle is provided, e.g. for the vehicle-onboard transmission of the distance information and/or for the connection of at least one communication part to the communication device, wherein the transmission system includes at least one bus system, preferably a LIN—(Local Interconnect Network) and/or CAN—(Control Area Network) and/or SPI (Serial Peripheral Interface) and/or I2C bus system (Inter-Integrated-Circuit-Bussystem), and preferably an encryption device, or is electrically-connected to an encryption device. Preferably, the I2C bus system concerns the communication between a distance-measuring component of the vehicle, such as the detection device and/or a communication part (e.g. of the detection device), and a microcontroller (e.g. of the detection device). In particular, an encryption of the data transmission of the bus system and/or between the distance-measuring component and the processing device is effected. Likewise, it is conceivable that a combination of the mentioned bus systems is employed.

It can further be possible that the detection device includes at least one communication part, in particular an antenna and/or a satellite component, for transmitting and/or receiving electromagnetic waves of a communication signal, wherein particularly preferably, the distance information can be transmitted from each communication part to the processing device via the transmission system in an encrypted manner. Preferably, at least two or at least three or at least four and/or at least five communication parts are arranged on the vehicle, for example partially on the roof of the vehicle. It is conceivable here that the encryption is already effected inside the communication part, or only in a detection evaluation unit of the detection device. Likewise, it can be provided that each of the communication parts comprises in each case one detection evaluation unit, which is used for encryption and/or decryption, for example. Accordingly, it can be provided that each of the communication parts comprises a, for example public, key information, in order to ensure a reliable encryption. The thus encrypted data can be decrypted e.g. only by means of a secret key information, but not by the public key information.

It is also advantageous that at least one communication part is arranged on the roof of the vehicle, wherein the communication part is electrically connected to a communication device of the vehicle. Alternatively or additionally, it is conceivable that at least one further communication part is arranged e.g. on the rear side of the vehicle and/or inside the vehicle. Furthermore, it can be possible that a determination of a distance information about the distance of the identification transmitter to the vehicle can be performed by a transceiver unit of the identification transmitter by means of an evaluation of the communication, and the distance information is transmittable to the security system, preferably to at least one communication part. This allows a reliable and secure determination of the distance.

BRIEF DESCRIPTION OF THE SEVERAL VIEWS OF THE DRAWINGS

Further advantages, features and details of the invention result from the following description, in which exemplary embodiments of the invention are described in detail with reference to the drawings. Here, the features mentioned in the claims and in the description can be essential to the invention individually or in any combination. The Figures show in:

The same reference characters are used for the same technical features even in different exemplary embodiments throughout the Figures.

DESCRIPTION OF SPECIFIC EMBODIMENTS OF THE INVENTION

Figure 1:
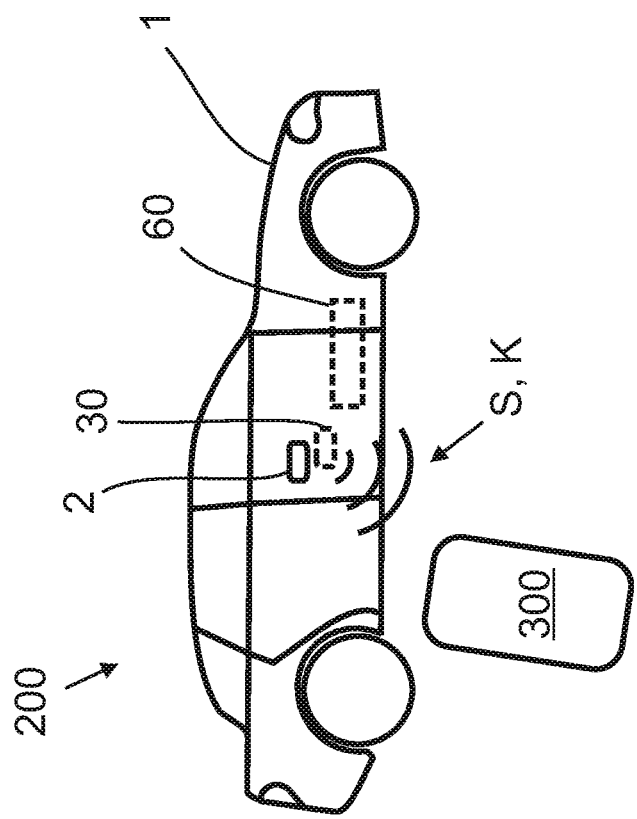
FIG. 1 a schematic side view of a vehicle.

FIG. 1 schematically shows a vehicle 1 in a side view. In this case, the vehicle 1 includes at least parts of a security system 200 according to the invention. Thus, a communication unit 30 as well as a processing device 60 is provided on and/or in the vehicle 1. Optionally, a proximity sensor 2 for the detection of an approach of an operator of the vehicle 1 is arranged in the area of the door handle of the vehicle 1. The communication unit 30 serves for the communication with a mobile identification transmitter 300. To that end, a communication field K is generated by the communication unit 30, wherein information is transmitted wirelessly via radio waves of the communication field K. For the communication with the mobile identification transmitter 300, communication signals S are received and/or sent by the communication unit 30, for example, preferably via the communication field K. In particular, the communication field K (as a UWB communication field K) serves for the transmission of UWB communication signals S, wherein in this case, the communication signal S uses radio waves (of the communication field K) in an especially wide frequency spectrum. Thus, the UWB communication signals S preferably include an especially wide frequency spectrum. Preferably, a frequency range with a bandwidth of at least 500 MHz is used for the communication field K and/or for the communication signal S. Accordingly, the communication signal S can be referred to as a wideband communication signal S.

Figure 2:
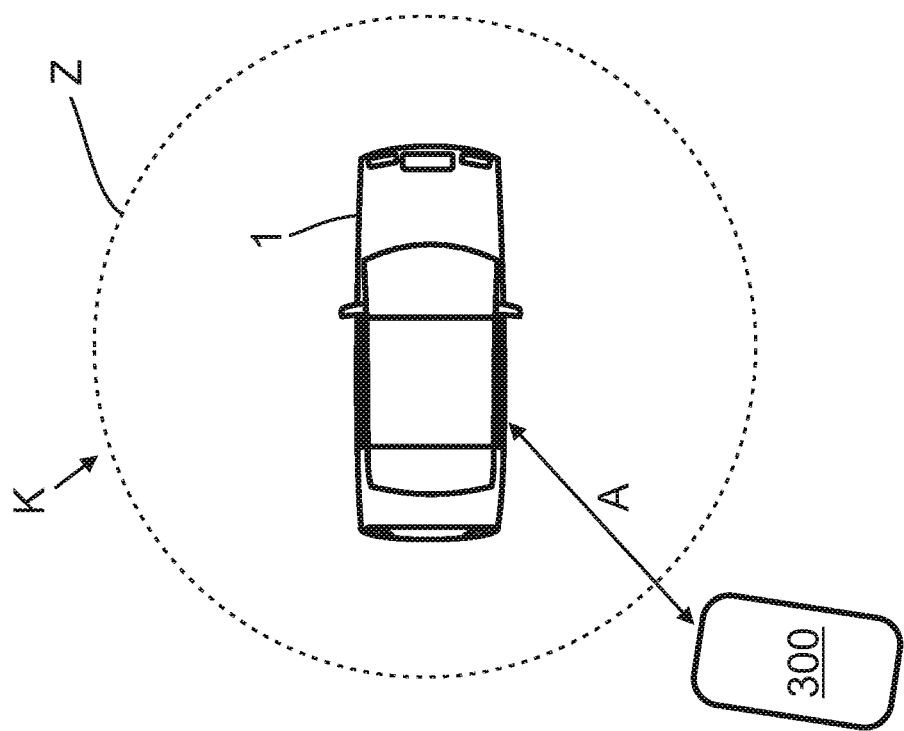
FIGS. 2, 3 and 4 schematic views of a vehicle in a plan view.

At least one security zone Z can be provided around the vehicle, wherein the extension of the security zone Z is particularly defined dependent upon the communication field K and/or a communication of the vehicle 1. This is schematically shown in FIG. 2, wherein the circular shape of the communication field K and/or of the security zone Z merely serves for illustration purposes. In reality, the range and/or extension of the security zone Z can likewise extend in an irregular manner, depending on the surroundings of the vehicle 1.

The security zone Z and/or different security zones Z of the vehicle 1 can be determined or defined in different manners. Thus, the range of communication via the communication signal S is, in particular, determined by the extension of the communication field K. Depending on this physical limitation of the range, the security zone Z can be defined in accordance with a first possibility. In this case, a distance determination can be used in order to perform a determination of a distance A between the identification transmitter 300 and the vehicle 1. When the security zone Z is determined by the maximum reach of the communication field K, it can be assumed for distance determination that the identification transmitter 300 being located outside the security zone Z, e.g. in the event that communication is not existent. In this case, the distance determination is effected based upon the maximum communication range. Alternatively or additionally, it can be provided in accordance with a second possibility that the security zone Z is defined as a maximum distance to the vehicle 1, which is, for example, within the maximum communication range. For the determination of the distance, consequently, the communication is performed actively and received signals are evaluated. To that end, the distance determination must determine distance information about the actual distance A of the identification transmitter 300 to the vehicle 1. This can take place by a signal transit time analysis of the communication signal S, for example. The evaluation of the communication signal S for the distance determination corresponds, in particular, to an evaluation of the communication between the vehicle 1 and the identification transmitter 300 and/or to an evaluation of the communication field K.

The distance determination and/or an evaluation of the distance information obtained thereby by a processing device 60 of the vehicle 1 allows a specific localization of the identification transmitter 300 relative to the security zone Z. The distance determination is initiated, for example, when an approach of the identification transmitter 300 is detected by a proximity sensor 2 of the vehicle 1. Alternatively or additionally, the distance determination can also be initiated as soon as a communication of the vehicle 1 with the identification transmitter 300 is possible and/or a connection has been established for communication. Furthermore, the distance determination can also be initiated in that an entry of the identification transmitter 300 into a certain security zone Z is monitored, and the initiation of the distance determination takes place when or after entering the said zone.

Figure 4:
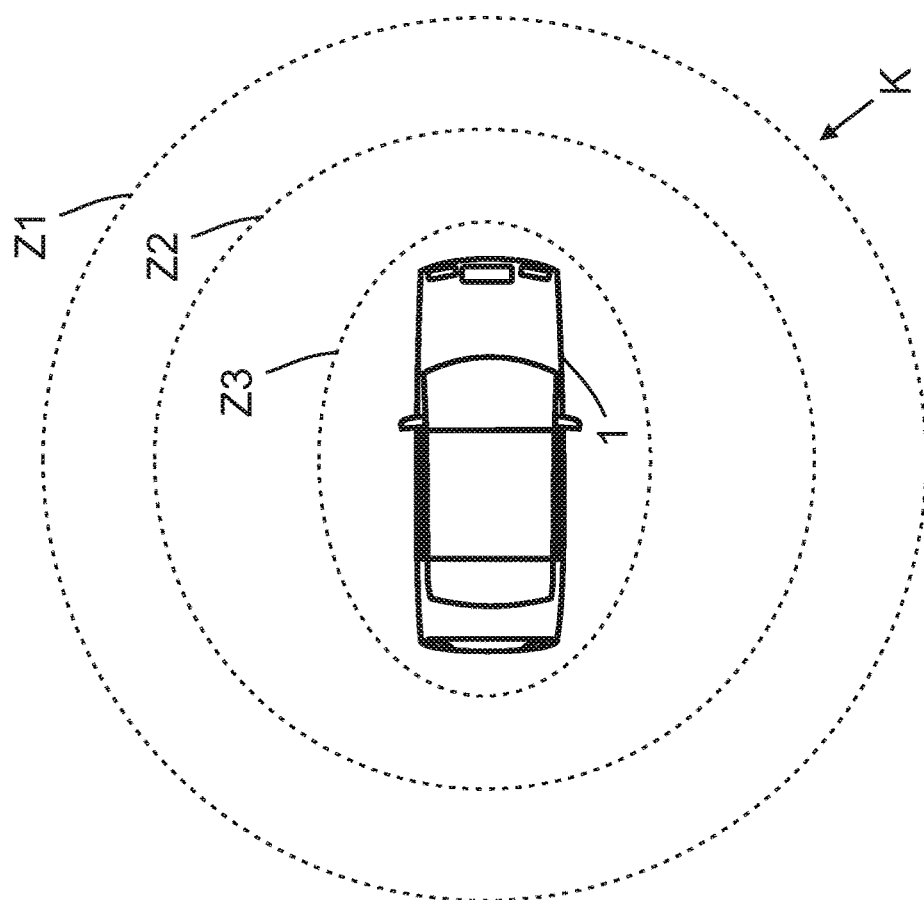
Figure 3:
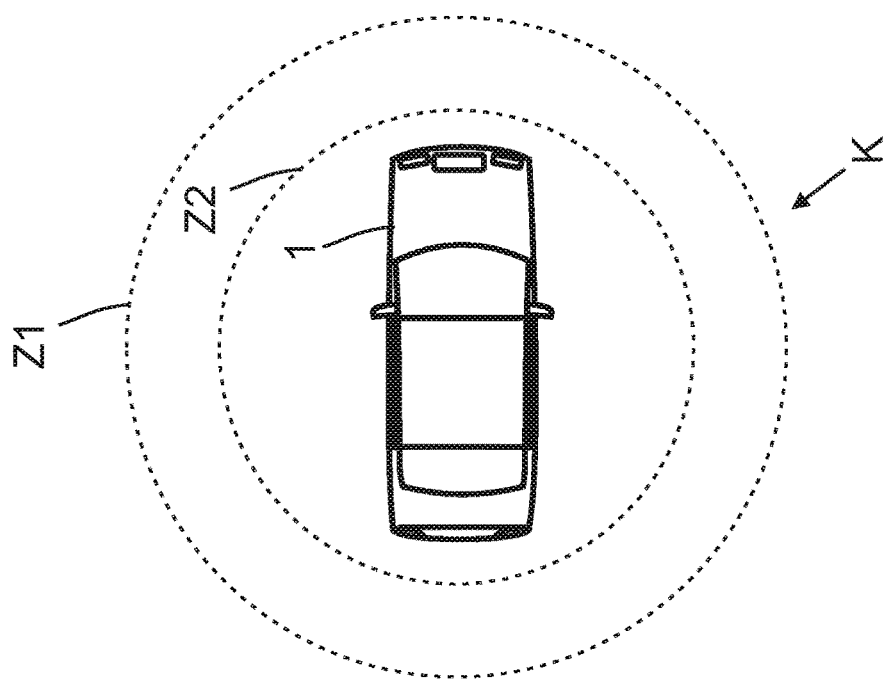

FIGS. 3 and 4 schematically show that likewise multiple security zones Z can be provided. For example, a first security zone Z1 and a second security zone Z2 as well as, as the case may be, a third security zone Z3 and/or further security zones Z can be provided at different distances to the vehicle 1. It is conceivable here that the third security zone Z3 having the smallest distance to the vehicle 1 forms a comfort zone Z3, wherein a localization of the identification transmitter 300 within the comfort zone Z3 (in particular merely) causes the activation of comfort functions. Such a comfort function is, for example, an activation of a front lighting system of the vehicle 1, which is particularly effected when the identification transmitter 300 enters the comfort zone Z3. Another comfort function is, for example the activation of a vehicle lighting system. The first security zone Z1 extends, in particular, at a greater distance from the vehicle 1 than the second security zone Z2. For example, the identification transmitter 300 is localized in the first security zone Z1 when a second communication is initiated by a second communication unit 32, for example a LF communication between the vehicle 1 and the identification transmitter 300. Here and/or dependent upon a further localization, for example the second communication, and/or in a successful pre-identification of the security system 200 with the identification transmitter 300, a first communication with a first communication unit 31 with the identification transmitter 300, preferably via ultra-wideband, can be initiated. Based upon this first communication, a distance determination can be re-conducted, for example through an evaluation of the communication signal S of the first communication, i.e. of a first communication signal S1. This renewed distance determination can preferably be repeated in a cyclic manner. If, now, a distance A of the identification transmitter 300 from the vehicle 1 is determined, by this renewed distance determination, to be equal to and/or smaller than the distance of the second security zone Z2 from the vehicle 1, a localization of the identification transmitter 300 within the second security zone Z2 is effected. Upon a successful localization of the identification transmitter 300 within the second security zone Z2, an authentication process can be initiated, for example. Now, a renewed distance determination can in turn be made. If, by this distance determination, a distance A of the identification transmitter 300 from the vehicle 1 is determined to be equal to and/or smaller than the distance of the third security zone Z3 from the vehicle 1, a localization of the identification transmitter 300 within the third security zone Z3 is effected. Upon a successful localization of the identification transmitter 300 within the third security zone Z3, a renewed authentication process can be performed and/or a comfort function can be activated and/or an access system of the vehicle 1 can be activated and/or a door and/or a lock of the vehicle 1 can be opened.

Figure 7:
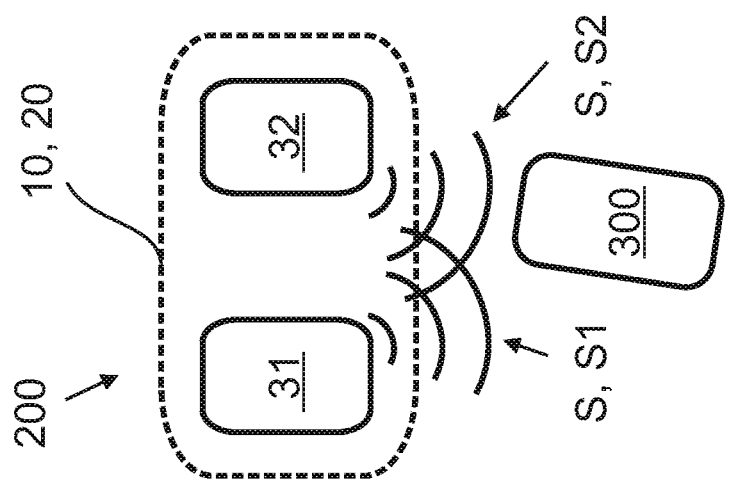
FIGS. 5, 6 and 7 schematic representations of a security system according to the invention, FIG. 8+9 further schematic representations of a security system according to the invention, FIG. 10 a further schematic representation of parts of a security system according to the invention, FIG. 11 a schematic plan view of a vehicle having a security system according to the invention, and FIG. 12 a schematic representation for visualizing a method according to the invention.
Figure 6:
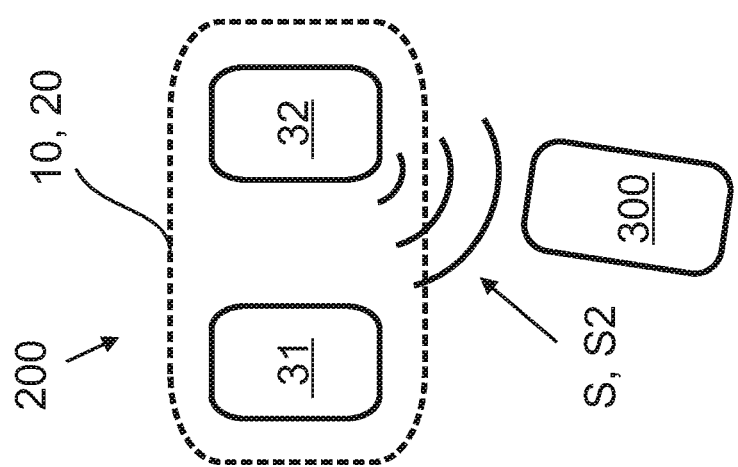
Figure 5:
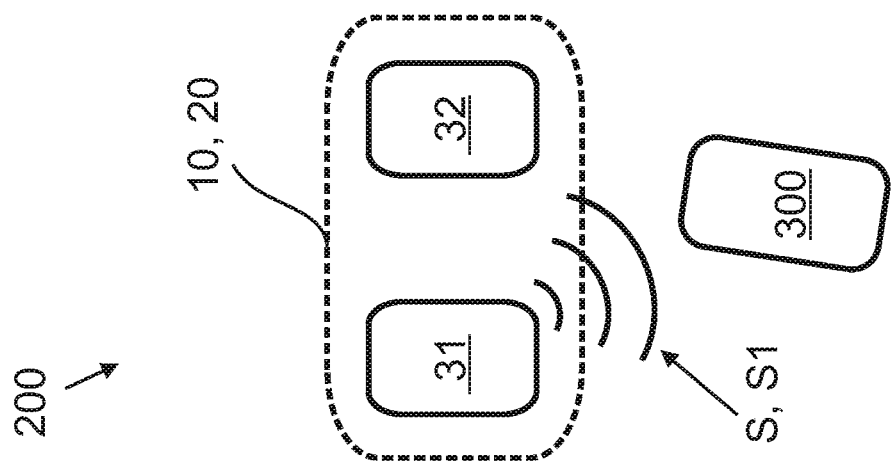

FIGS. 5 to 7 show this process in a more detailed manner, in particular the first and second communication. The security system 200 includes at least one detection device 10 and/or at least one communication device 20 for performing communication. Here, the communication device 20 can, for example, be at least part of the detection device 10 of the vehicle 1. Thus, the communication device 20 and/or the detection device 10 can be electrically connected to one another, for example, and/or be formed as a (common), in particular electric, component. It is also conceivable that the communication device 20 receives the signals of communication, evaluates them, as the case may be, and particularly performs a distance determination and/or detects the distance information. Thus, the communication device 20 can also form the detection device 10 (or correspond to it), and/or vice versa. The communication device 20 and/or the detection device 10 includes at least one communication unit 30, preferably a first communication unit 31 and a second communication unit 32. The first communication unit 31 serves for a first communication with the identification transmitter 300 and the second communication unit 32 serves for a second communication with the identification transmitter 300.

A first communication signal S1 is used for the first communication, and a second communication signal S2 is used for the second communication. According to FIG. 5, the first communication takes place, for example, via the first communication signal S1 for the distance determination. According to FIG. 6, the second communication can be used via the second communication signal S2, in order to transmit, for example, a wake-up signal to the identification transmitter 300, and/or also perform a distance determination. Just as well, the emission of the wake-up signal and the subsequent monitoring for a reply signal can be considered to be a distance determination (in regard to the maximum communication range, which is used as an indicator for the entry into a security zone Z and/or for the required distance A). According to FIG. 7, a first and second communication is used simultaneously. In this way, for example via the second communication, i.e. via the second communication signal S2, the distance determination can be performed, wherein the result of the distance determination (i.e. the distance information) is verified based on a further distance determination by the first communication with the first communication signal S1. It is also conceivable that an authentication is performed via the first and/or second communication. Furthermore, it can be provided that the first communication is only used in the event that the second communication is faulty, for example.

Figure 8:
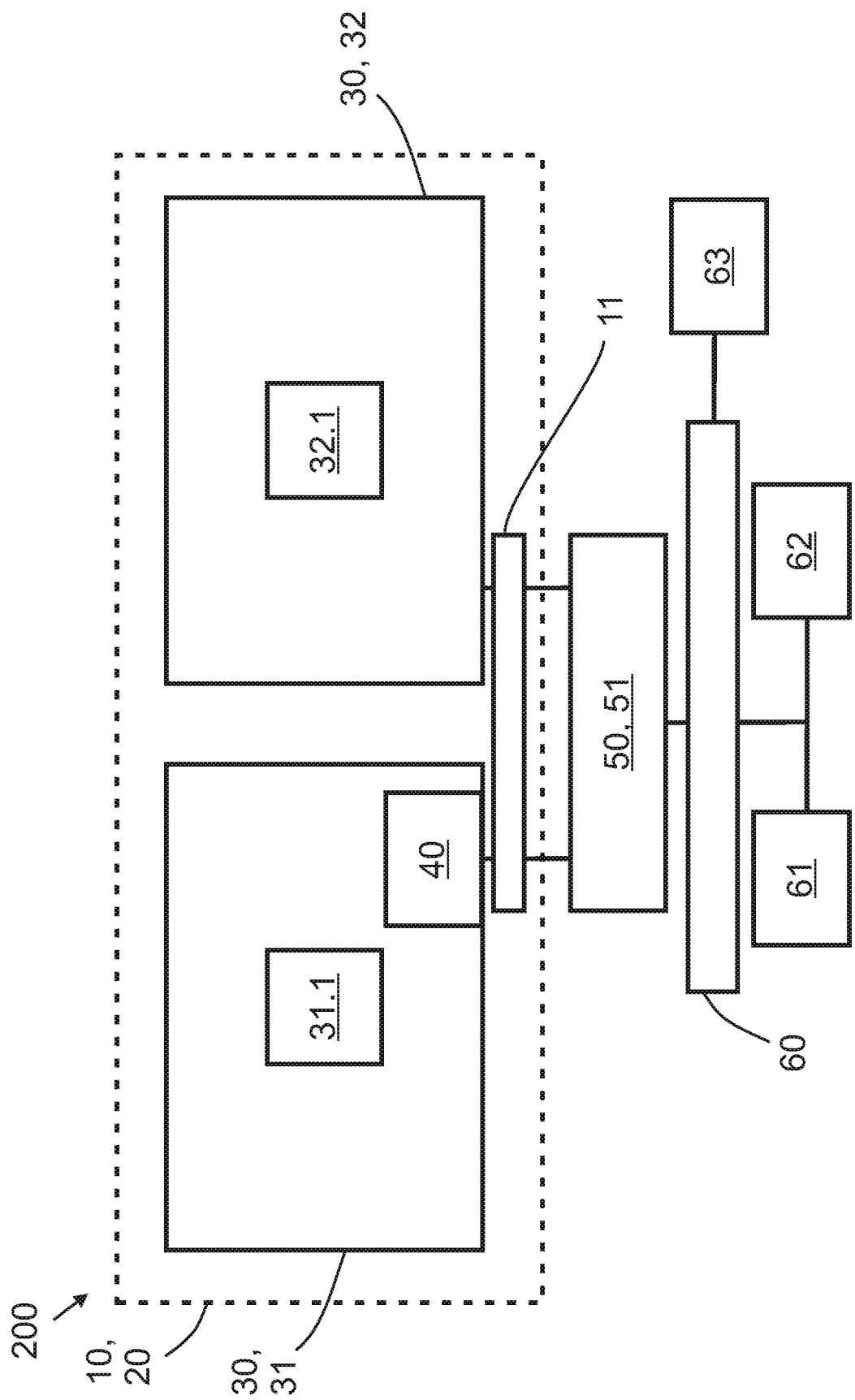
Figure 9:
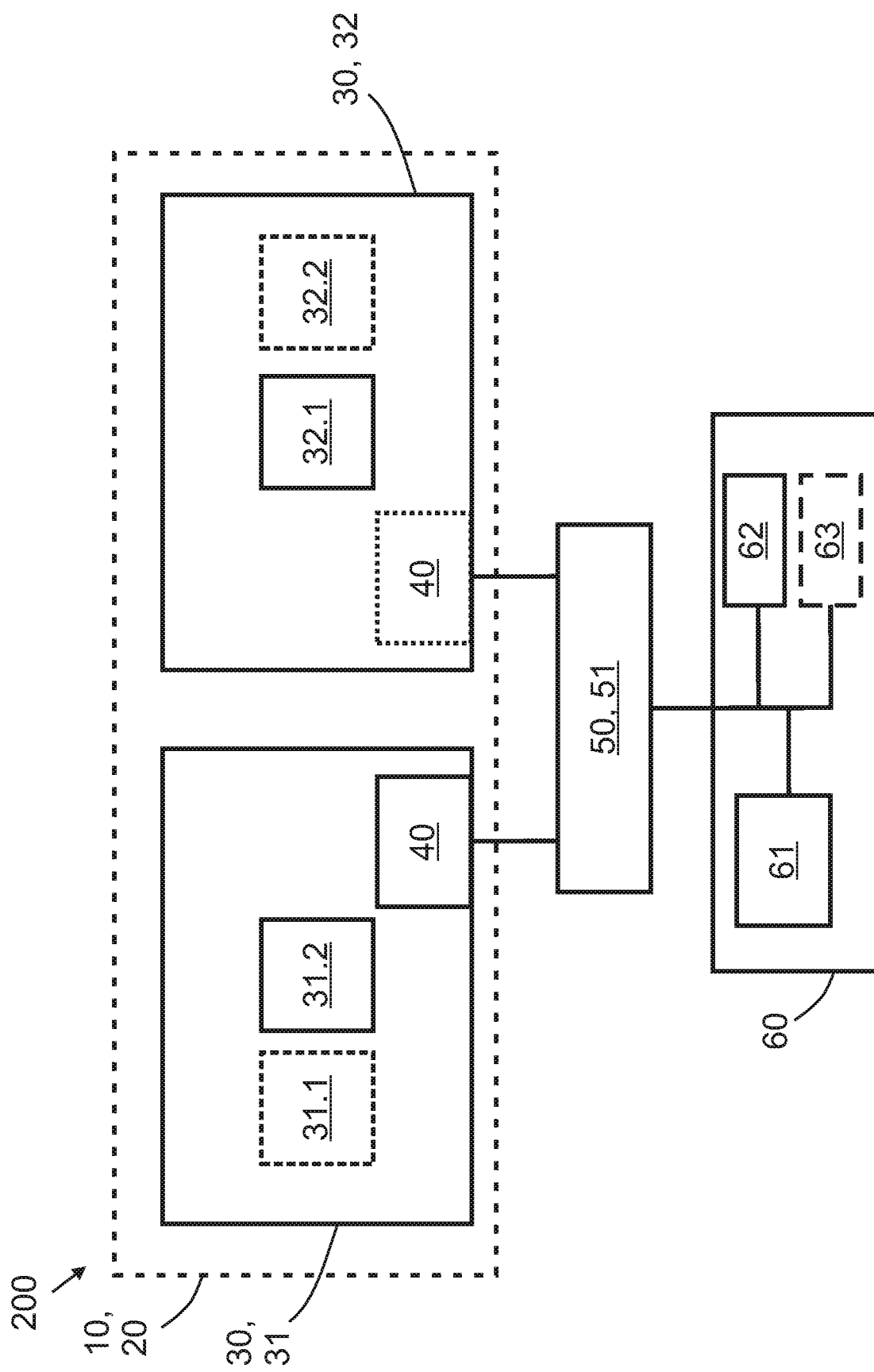

FIG. 8 shows a schematic construction of a detection device 10 and/or a communication device 20 of a security system 200 according to the invention. Here, the detection device 10 and/or the communication device 20 includes at least one communication unit 30, in particular a first communication unit 31 and a second communication unit 32. The first communication unit 31 includes at least one first communication interface 31.1, in particular an ultra-wideband interface and/or a Bluetooth interface. The second communication unit 32 includes at least one second communication interface 32.1, preferably a LF interface and/or HF interface. FIG. 9 shows that optionally the first communication unit 31 may comprise at least one further first communication interface 31.2, preferably a Bluetooth interface. Likewise, the second communication unit 32 can include yet a further second communication interface 32.2, preferably a HF interface and/or a Bluetooth interface. The communication interfaces serve for performing the first and/or second communication via the corresponding communication technology. Furthermore, the communication interfaces can also be electrically connected to corresponding communication parts 35, such as antennas. Thus, the communication device 20 is capable of performing communication, via one or multiple communication technologies, with the identification transmitter 300. In particular, the communication device 200 can of course also only include one single (for example first) communication unit 30, 31 and/or only one single (for example first) communication interface, so that only one single (for example first) communication with the identification transmitter 300 is possible via one single communication technology, for example via ultra-wideband. After that, the information of the communication signals S received from the communication device 20 via the communication parts 35 are transmitted to a processing device 60 of the vehicle 1 via a transmission system 50 of the vehicle 1. The information, such as a distance information, can likewise be transmitted in an encrypted manner here. Optionally, the communication device 20 and/or each (or only one single) communication unit 30 includes at least one encryption device 40 to that end. The encryption device 40 is, for example, formed as an integrated circuit, in particular as a security chip. During transmission via the transmission system 50, the information is transmitted by at least one transmission station 51 of the vehicle 1. The transmission system 50 is formed as a bus system of the vehicle 1, for example. The transmission station 51 is a bus user of the transmission system 50, for example.

For performing the distance determination, the processing device 60 shown in FIGS. 8 and 9 can be used, which, for example, is configured as a central processing device 60 of a central vehicle electronics of the vehicle 1. Thus, the processing device 60 is, for example, centrally provided in the vehicle 1. The processing device 60 can preferably be arranged in the vehicle 1 in a (delimited) distributed manner and comprise multiple components. Alternatively, it is also possible that the processing device 60 is arranged centrally in the vehicle 1 in terms of space, for example as a single component. The components of the communication device 20 and/or of the detection device 10 can preferably be arranged in the vehicle in a distributed manner, wherein the communication units 30 (and/or the respective communication interfaces) can each be arranged and/or formed separately in the vehicle. Here, it is also conceivable, as an alternative, that the communication device 20 and/or the detection device 10 are arranged and/or formed in the vehicle 1 as a spatially-delimited component and/or are arranged and/or formed in the vehicle 1 in a spatially-delimited manner. Thus, the association of the communication units 30 to the communication unit 20 thus preferably corresponds to a strictly functional (logical) association.

Alternatively or in addition, a distance determination can be performed by a detection evaluation unit 11 of the detection device 10 and/or the communication device 20. Furthermore, the detection/evaluation unit 11 and/or the processing device 60 comprises, for example, electronic components such as integrated circuits and/or processors to perform the distance determination and/or an evaluation of the distance information. For the evaluation of the distance information and/or for the distance determination, the processing unit 60 particularly comprises an evaluation device 61. In order that the distance information can be evaluated, it must preferably be decrypted first. To that end, the processing device 60 is electrically, in particular electronically, connected to a decryption device 62. As a matter of fact, the evaluation device 61 can optionally perform the decryption itself, so that no decryption device 62 must be provided. It is also conceivable that the processing device 60 is electrically connected to the data storage unit 63, wherein a digital key information for decryption is digitally stored in the data storage unit 63 in a manner readable to the processing device 60 and/or the evaluation device 61. The digital key information is, for example, a cryptographic key. The evaluation device 61 and/or the decryption device 62 and/or the data storage unit 63 of the processing device 60 can thereby be arranged on a common circuit board and/or be electrically connected to one another, as shown schematically by FIG. 9. In this case, the data storage unit 63 is only optionally to be provided as a separate component, which is illustrated by a dashed line in FIG. 9. Alternatively, the data storage unit 63 can likewise be integrated in the evaluation device 61 and/or in the decryption device 62, for example as a Flash memory.

Figure 10:
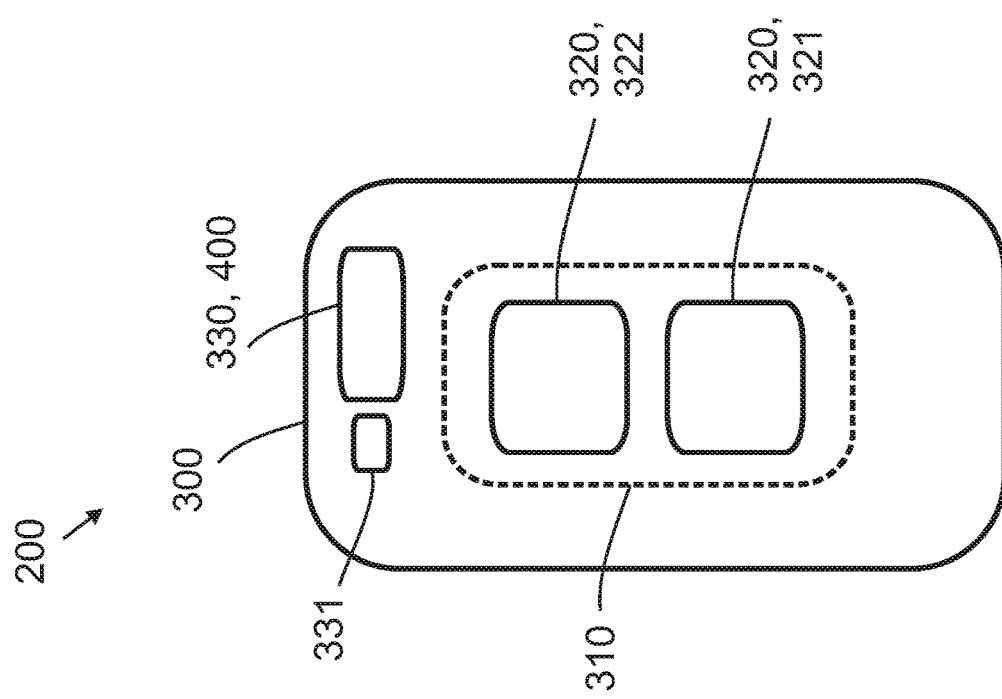

FIG. 10 shows a schematic structure of a mobile identification transmitter 300 of a security system 200 according to the invention. The mobile identification transmitter 300 includes a transceiver device 310, which serves for the communication with the vehicle 1, in particular with the communication device 20. In particular, the transceiver device 310 comprises at least one transceiver unit 320, preferably a first transceiver unit 321 for performing a first communication with the vehicle 1 and a second transceiver unit 322 for performing a second communication with the vehicle 1. Naturally, only one single (for example first) transceiver unit 320, 321 can be provided, so that only one (for example first) communication can be performed. The first transceiver unit 321 is, for example, configured for performing an ultra-wideband communication, and/or the second transceiver unit 322 is configured for performing HF and/or LF communication, for example. In this way, communication signals S, in particular a first communication signal S1 and/or a second communication signal S2, can be wirelessly transmitted to the communication device 20 of the vehicle 1. The transmission can be effected in an encrypted manner, for example, wherein an encryption unit 331 of the identification transmitter 300 is provided and/or electrically connected to the transceiver device 310 (directly or indirectly) to that end. Optionally, it is conceivable that a distance determination is also performed by the identification transmitter 300 based upon the communication signal S. To that end, for example, a processing unit 330 is used as a distance determination device 400.

Figure 11:
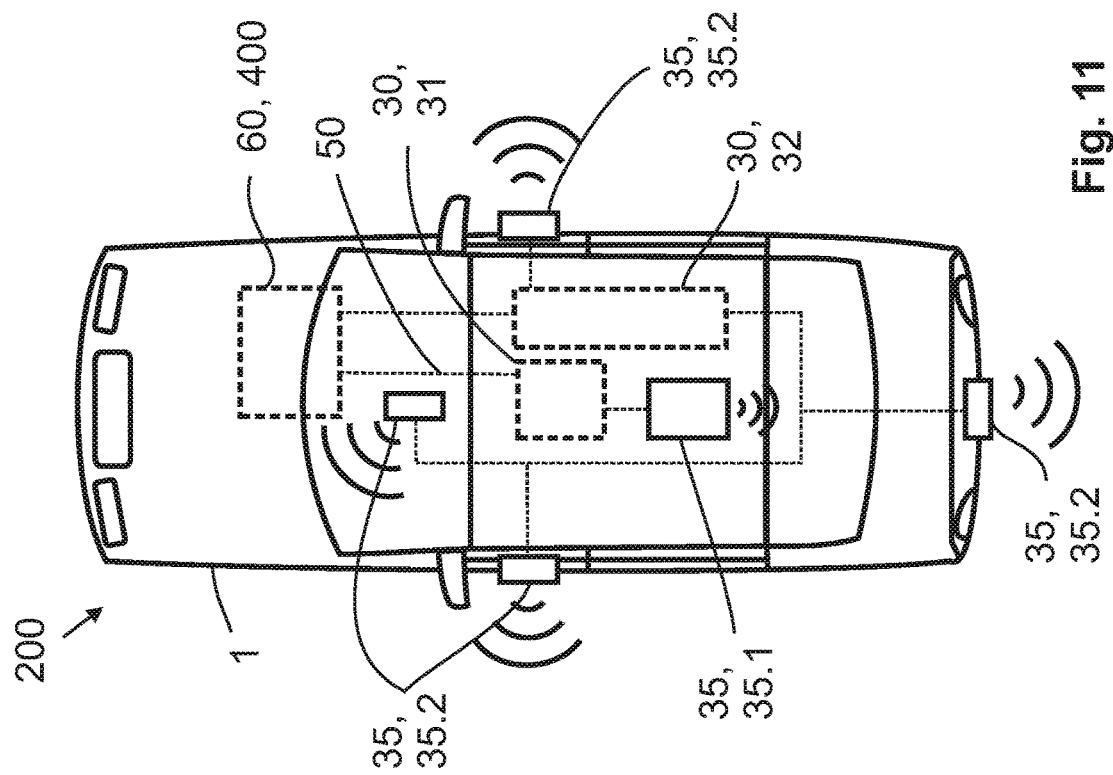

FIG. 11 shows a plan view of a vehicle 1, which comprises a security system 200 according to the invention. The security system 200 includes at least one communication device 20 here, which serves for the communication with an identification transmitter 300. FIG. 11 shows two different communication units 30 of the communication device 20, wherein, naturally, only one single of these communication devices 30 can be provided. In order to emit corresponding communication signals S by means of the communication device 20, the communication device 20 and/or the communication device 30 includes at least one communication part 35, which is formed as an antenna and/or as a satellite. Thus, a first communication part 35.1 can be arranged on a roof of the vehicle 1, for example. Furthermore, it is conceivable that even further communication parts 35, in particular a second communication part 35.2, are arranged on the side region of the vehicle 1 and/or on the roof of the vehicle 1. It is also conceivable that further first communication parts 35.1 are provided on the vehicle 1 in addition to the first communication part 35.1, which in each case serve for the first communication with the identification transmitter 300. To that end, the first communication part 35.1 or each first communication part 35.1 is electrically connected to a first communication unit 31 of the vehicle 1. The second communication part 35.2 or each second communication part 35.2 serves for the second communication by the second communication unit 32 and is electrically connected to the second communication unit 32 of the vehicle 1. The electric connection of the first communication part 35.1 to the first communication unit 31 and/or of the second communication part 35.2 to the second communication unit 32 is effected, for example, via electric lines and/or via a transmission system 50, with the information transmitted via the transmission system 50 being transmitted particularly in an encrypted manner. Alternatively or in addition, it is possible that the electric connection between the first communication unit 31 to the processing device 60 and/or the electric connection of the second communication unit 32 to the processing unit 60 is effected via the transmission system 50. Just as well, the information, in particular the distance information detected by the first communication unit 31, can be transmitted to the processing device 60 via the transmission system 50 in an encrypted manner. The processing device 60 particularly serves as a distance determination device 400 for the (additional) determination, verification and/or evaluation of the distance information. Thus, the security of the distance determination and/or of the evaluation of the distance information can be ensured by the encrypted transmission. The first communication part 35.1 and/or the second communication part 35.2 is/are formed, for example, as an antenna and/or transmitter and/or receiver for the communication, in particular by means of a UWB communication method. Preferably, the first communication part 35.1 and/or the second communication part 35.2 are arranged asynchronously (on the vehicle 1).

FIG. 12 schematically shows a method 100 according to the invention. According to a first method step 100.1, at least one distance information about a distance A of the mobile identification transmitter 300 to the vehicle 1 is determined by a distance determination by means of a wideband communication signal S, S1. According to a second method step 100.2, the distance information is evaluated, whereby a localization of the identification transmitter 300 relative to the at least one security zone Z of the vehicle 1 is effected dependent upon the distance information. According to an optional third method step 100.3, a security information for the security system is determined dependent upon the localization.

The above explanation of the embodiments describes the present invention exclusively by way of examples. Individual features of the embodiments can naturally also be freely combined with one another, as far as technically reasonable, without departing from the scope of the present invention.

LIST OF REFERENCE CHARACTERS

1 Vehicle
2 Proximity sensor
10 Detection device
11 Detection evaluation unit
20 Communication device
30 Communication unit
31 First communication unit
31.1 Communication interface, ultra-wideband interface
31.2 Communication interface, Bluetooth interface
32 Second communication unit
32.1 Communication interface, LF interface
32.2 Communication interface, HF interface
35 Communication part, antenna
35.1 First communication part
35.2 Second communication part
40 Encryption device
50 Transmission system
51 Transmission station
60 Processing device
61 Evaluation device
62 Decryption device
63 Data storage device
100 Method
100.1 First method step
100.2 Second method step
100.3 Third method step
200 Security system
300 Identification transmitter
310 Transceiver
320 Transceiver unit
321 First Transceiver unit
322 Second transceiver unit
330 Processing unit
331 Encryption unit
400 Distance determination device
A Distance
K Communication field
S Communication signal
S1 First communication signal of a first communication
S2 Second communication signal of a second communication
Z Security zone
Z1 First security zone
Z2 Second security zone
Z3 Third security zone, comfort zone

What is claimed is:

1. A method for an activation of at least one security function of a security system of a vehicle, wherein an authentication at the security system of the vehicle is effected by a mobile identification transmitter, comprising the following steps:
   a) determining at least one distance information about a distance of the mobile identification transmitter from the vehicle based on an analysis of a communication between the identification transmitter and the vehicle,
   b) evaluating the distance information, whereby a localization of the identification transmitter dependent upon the distance information is effected, and
   c) determining a security information for the security system dependent upon the localization;
      wherein the analysis of the communication comprises analysis of a first communication signal and a second communication signal, wherein the second communication signal has a frequency bandwidth lower than a frequency bandwidth of the first communication signal;
   wherein a distance determination device performs the step of determining at least one distance information with the first communication signal by means of at least one of a signal transit time analysis and signal strength, and with the second communication signal by means of a signal strength or a range limitation.

2. The method according to claim 1, wherein the communication is effected between the mobile identification transmitter and a communication device of the vehicle, wherein the first communication signal and second communication signal each comprise a wide-band communication signal, an ultrawideband signal, an LF communication signal, an HF communication signal, a Bluetooth communication signal, or an infrared communication signal.

3. The method according to claim 1, wherein the distance determination according to step a) is effected by an evaluation of the communication by the vehicle.

4. The method according to claim 1, wherein the distance determination according to step a) is effected by an evaluation of the communication signal by the identification transmitter, wherein the following step is provided:
   Detecting the distance information by a detection device of the vehicle, wherein the detection device comprises the communication device.

5. The method according to claim 1, wherein the distance determination according to step a) is effected by a determination of a signal transit time of the signal.

6. The method according to claim 1, wherein a signal transit time analysis is performed for distance determination according to step a), wherein the following steps are provided:

emitting a query information via the communication, by a communication device of the vehicle,
receiving the query information, by a transceiver of the identification transmitter,
emitting a reply information via the communication as a reply to the query information, by the transceiver,
receiving the reply information, by the communication device,
determining a signal transit time of the signal,
determining the distance information based upon the signal transit time of the signal.

7. The method according to claim 1, wherein the signal transit time analysis is effected for the distance determination according to step a) in such a way that a time-critical evaluation of a signal transit time of the first communication signal is ensured within a predetermined time period, wherein the evaluation of the signal transit time analysis is implemented exclusively by at least hardware or software invariant or real-time capable.

8. The method according to claim 1, wherein at least the first or second communication unit of the communication device of the vehicle or a first or second transceiver unit of a transceiver of the identification transmitter emits an initiation information for initiating the communication between the identification transmitter and the communication device in a cyclic or repeated manner.

9. The method according to claim 1, wherein by the evaluation of the distance information, the localization of the identification transmitter relative to at least one security zone of the vehicle is effected dependent upon the distance information, wherein at least the extension of a security zone is adjusted in that or the distance determination is effected in that the transmission or receiving power of a transceiver, of the identification transmitter is adjusted, or the transmission or receiving power of the communication device of the vehicle, is adjusted.

10. The method according to claim 1, wherein a first communication is initiated via the communication signal as a first communication signal dependent upon a second communication via a second communication signal, wherein the first communication is initiated by the receiving of an initiation information by the identification transmitter.

11. The method according to claim 1, wherein at least a first or second communication is performed between the identification transmitter and the vehicle in an encrypted manner.

12. The method according to claim 1, further comprising:
performing a localization of the identification transmitter (300) relative to at least one of a plurality of security zones depending on the distance information; and
activating the at least one security function according to the localization.

13. A mobile identification transmitter for an activation of at least one security function of a security system of a vehicle and for authentication at the security system of the vehicle, wherein a wireless communication between the identification transmitter and a communication device of the vehicle is performed, comprising a transceiver, wherein by the transceiver a determination of at least one distance information about a distance of the mobile identification transmitter from the vehicle is performed by a distance determination calculated based on an analysis of at least one of a signal time analysis or a signal strength of a first communication signal, and at least one of a signal strength or a range limitation of a second communication signal, wherein the second communication signal has a frequency bandwidth lower than a frequency bandwidth of the first communication signal, and; wherein the transceiver includes a first transceiver unit and a second transceiver unit, wherein the first transceiver unit comprises an ultrawideband interface and the second transceiver unit includes a Bluetooth or Bluetooth Low Energy or LF or HF interface.

14. The mobile identification transmitter according to claim 13, wherein the identification transmitter includes an encryption unit, whereby an encrypted transmission of the distance information to the communication device is performed.

15. The mobile identification transmitter according to claim 13, wherein the identification transmitter is operated in accordance with a method for an activation of at least one security function of a security system of a vehicle, wherein an authentication at the security system of the vehicle is effected a mobile identification transmitter, comprising the following steps:
a) determining at least one distance information about a distance of the mobile identification transmitter from the vehicle by a distance determination calculated based on at least one communication signal of a communication between the identification transmitter and the vehicle,
b) evaluating the distance information, whereby a localization of the identification transmitter dependent upon the distance information is effected,
c) determining a security information for the security system dependent upon the localization.

16. A security system for a vehicle, comprising:
a mobile identification transmitter for authentication at the security system,
a communication device of the vehicle for the communication with the identification transmitter via a first and a second communication signal, wherein the second communication signal has a frequency bandwidth lower than a frequency bandwidth of the first communication signal,
a distance determination device for the determination of at least one distance information about a distance of the mobile identification transmitter from the vehicle by a distance determination based upon at least one communication signal of the communication,
wherein the distance determination device is configured to determine the at least one distance information with the first communication signal by means of at least one of a signal transit time analysis and signal strength, and with the second communication signal by means of a signal strength or a range limitation;
wherein the communication device comprises a first and a second two communication unit at the vehicle;
wherein the first communication unit is configured as an ultrawideband interface and the second communication unit is configured as a Bluetooth interface or as a Bluetooth Low Energy interface or as an LF or HF interface.

17. The security system according to claim 16,
wherein at least a detection device of the vehicle or the communication device includes at least one communication part for at least sending or receiving electromagnetic waves of the communication signal, wherein the distance information is transmitted in an encrypted manner from each of the communication parts via a transmission system to a processing device of the vehicle.

18. The security system according to claim 16, wherein at least one communication part is arranged on the roof of the vehicle, wherein the communication part is electrically connected with the communication device of the vehicle.

19. The security system according to claim 16, wherein the security system is operated at least in accordance with a method for an activation of at least one security function of a security system of a vehicle, wherein an authentication at the security system of the vehicle is effected by a mobile identification transmitter, comprising the following steps: a) determining at least one distance information about a distance of the mobile identification transmitter from the vehicle by a distance determination calculated based on at least one communication signal of a communication between the identification transmitter and the vehicle, b) Evaluating the distance information, whereby a localization of the identification transmitter dependent upon the distance information is effected, c) Determining a security information for the security system dependent upon the localization or includes an identification transmitter for an activation of at least one security function of a security system of a vehicle and for the authentication at the security system of the vehicle, wherein a wireless communication between the identification transmitter and a communication device of the vehicle is performed, wherein a transceiver is provided, wherein by the transceiver a determination of at least one distance information about a distance of the mobile identification transmitter from the vehicle is performed by a distance determination calculated based on at least one communication signal of the communication.

20. The security system according to claim 17, wherein the at least one communication part is at least an antenna or a satellite component.

21. A method for an activation of at least one security function of a security system of a vehicle, wherein an authentication at the security system of the vehicle is effected by a mobile identification transmitter, comprising the following steps:
   a) determining at least one distance information about a distance of the mobile identification transmitter from the vehicle based on an analysis of a communication between the identification transmitter and the vehicle,
   b) evaluating the distance information, whereby a localization of the identification transmitter dependent upon the distance information is effected,
   c) determining a security information for the security system dependent upon the localization;
      wherein the analysis of the communication comprises analysis of a first communication signal and as a second communication signal, wherein the second communication signal has a frequency bandwidth lower than a frequency bandwidth of the first communication signal;
   and wherein the first communication signal and second communication signal are transmitted concurrently.

22. A security system for a vehicle, comprising:
   a mobile identification transmitter for authentication at the security system,
   a communication device of the vehicle for the communication with the identification transmitter via a first and a second communication signal, wherein the second communication signal has a frequency bandwidth lower than a frequency bandwidth of the first communication signal,
   a distance determination device for the determination of at least one distance information about a distance of the mobile identification transmitter from the vehicle by a distance determination based upon at least one communication signal of the communication;
wherein the communication device comprises a first and a second communication unit at the vehicle, wherein the second communication signal has a frequency bandwidth lower than a frequency bandwidth of the first communication signal; and wherein the first and second communication signals are configured to be transmitted concurrently;
wherein the first communication unit is configured as an ultrawideband interface and the second communication unit is configured as a Bluetooth interface or as a Bluetooth Low Energy interface or as an LE or HF interface.

* * * * *